US012588576B1

(12) United States Patent
Demos

(10) Patent No.: US 12,588,576 B1
(45) Date of Patent: Mar. 31, 2026

(54) INTELLIGENT TURF MAINTENANCE SYSTEM FOR DIVOT DETECTION AND REPAIR

(71) Applicant: Chris Peter Demos, Memphis, TN (US)

(72) Inventor: Chris Peter Demos, Memphis, TN (US)

( * ) Notice: Subject to any disclaimer, the term of this patent is extended or adjusted under 35 U.S.C. 154(b) by 0 days.

(21) Appl. No.: 19/381,292

(22) Filed: Nov. 6, 2025

(51) Int. Cl.
| | |
|---|---|
| *A01B 45/00* | (2006.01) |
| *A01B 45/02* | (2006.01) |
| *B64U 20/80* | (2023.01) |
| *B64U 101/30* | (2023.01) |
| *B64U 101/45* | (2023.01) |
| *E01C 13/08* | (2006.01) |

(52) U.S. Cl.
CPC .............. *A01B 45/00* (2013.01); *A01B 45/02* (2013.01); *B64U 20/80* (2023.01); *B64U 2101/30* (2023.01); *B64U 2101/45* (2023.01); *B64U 2201/104* (2023.01); *E01C 13/08* (2013.01)

(58) Field of Classification Search
CPC ................ B64U 20/80; B64U 2102/45; B64U 2101/30; B64U 2201/104; A01B 45/00; A01B 45/02; E01C 13/08
See application file for complete search history.

(56) References Cited

U.S. PATENT DOCUMENTS

| | | | | |
|---|---|---|---|---|
| 11,339,540 | B1 * | 5/2022 | Cobb | ...................... E01C 19/45 |
| 11,696,535 | B2 * | 7/2023 | Friell | ..................... A01C 21/00 |
| | | | | 404/75 |
| 11,864,499 | B2 * | 1/2024 | McClure, Jr. | ......... B64C 39/024 |
| 12,043,967 | B2 * | 7/2024 | Loar | ..................... E01C 19/201 |
| 12,239,055 | B2 * | 3/2025 | Friell | ..................... G05D 1/028 |
| 2019/0278269 | A1 * | 9/2019 | He | ........................ G05D 1/0225 |
| 2020/0337201 | A1 * | 10/2020 | Siekmann | ............. E01C 19/004 |
| 2021/0368696 | A1 * | 12/2021 | Friell | ................... A01B 69/008 |
| 2023/0292680 | A1 * | 9/2023 | Friell | ..................... A01C 21/00 |
| | | | | 404/75 |

* cited by examiner

*Primary Examiner* — Kyle Armstrong
(74) *Attorney, Agent, or Firm* — H. Brock Kolls

(57) ABSTRACT

The present invention relates to an automated turf repair and condition-management system configured to detect, fill, and monitor divots and surface irregularities on turf areas such as golf courses and athletic fields. The system includes an air-assisted dispensing array that precisely delivers a dry repair material through multiple controllable nozzles, and a liquid-mist subsystem that applies water, binder, or growth solution post-nozzle to create a wetted, stabilized fill. A control system measures divot geometry, computes fill volume, and regulates airflow, mist, and nozzle activation in real time. The system can be integrated with a host vehicle or autonomous platform, and may operate in coordination with aerial drones for GPS-based mapping, repair scheduling, and regrowth monitoring. This integrated approach enables data-driven, repeatable, and biologically responsive turf restoration with improved accuracy, reduced labor, and accelerated surface recovery compared to prior mechanical or manual repair methods.

20 Claims, 9 Drawing Sheets

Ⓐ

210

100/216

Ⓑ

212

100/216

1

INTELLIGENT TURF MAINTENANCE SYSTEM FOR DIVOT DETECTION AND REPAIR

TECHNICAL FIELD OF THE INVENTION

This invention relates to automated turf maintenance and restoration systems, and particularly to a turf repair and condition-management system configured for precision detection, filling, and monitoring of divots or surface irregularities using air-assisted material dispensing and adaptive liquid-mist control. The invention further relates to autonomous and semi-autonomous implementations of such systems that incorporate sensor-based geometry analysis, GPS mapping, aerial-drone coordination, and data-driven control of repair operations. More specifically, the invention pertains to a modular, vehicle- or drone-integrated platform that dispenses sand, seed, binder, or growth-promoting liquids in precisely metered amounts and at dynamically targeted locations, enabling accurate divot repair, improved turf recovery, and reduced manual labor requirements. The invention also extends to computer-implemented methods and control architectures that monitor, record, and optimize turf restoration performance over time through predictive analytics and networked communication between ground units, drones, and remote computing resources.

BACKGROUND OF THE INVENTION

Before our invention, turf maintenance and divot repair on golf courses, athletic fields, and other landscaped environments largely relied on manual or semi-mechanical approaches that were labor-intensive, inconsistent, and inefficient. Grounds crews often had to visually inspect large areas for divots and damaged turf, a process that consumed significant time and required substantial manpower. These prior approaches frequently produced inconsistent results because detection accuracy depended heavily on operator experience and environmental visibility, leading to missed or unevenly repaired areas.

Mechanical solutions that existed often used simple auger feeds or gravity-fed dispensing systems for repair material delivery, which lacked the precision to proportionally fill divots according to their geometry. These systems tended to overfill or underfill the repair area, leaving mounded or uneven surfaces that degraded playability and aesthetics. Additionally, most dispensing mechanisms delivered material without airflow assistance, resulting in clumping, blockages, and poor distribution of sand or seed mixtures.

Furthermore, traditional turf maintenance practices lacked integrated sensing, data recording, or feedback mechanisms. There was no system capable of detecting the precise geometry or volume of a divot, tracking repair outcomes, or monitoring turf recovery over time. Without such data, grounds crews could not effectively analyze high-wear zones, assess long-term turf health, or predict maintenance needs.

The absence of automation, data integration, and adaptive control in these prior approaches resulted in inefficiencies, inconsistent surface quality, and higher labor costs. The present invention addresses these and other shortcomings by providing a comprehensive, intelligent, and automated turf-repair and condition-management system capable of detecting, filling, and monitoring divots with precision and repeatability. For these reasons and shortcomings, as well as other reasons and shortcomings, there is a long-felt need that gives rise to the present invention.

SUMMARY OF THE INVENTION

The shortcomings of the prior art are overcome, and additional advantages are provided through the provision of a turf repair and condition-management system configured for automated detection, precision filling, and monitoring of divots and turf surface irregularities. The system includes a hopper that stores a dry repair material such as sand, seed, or a mixture thereof, and an air-assisted manifold that propels the material through a plurality of conduits to a dispensing array. The dispensing array comprises multiple nozzles arranged across the width of the system and configured for selective activation based on detected divot geometry. A liquid-mist subsystem positioned near the nozzles emits a fine mist of water, binder, or combinations thereof, mixing with the dry material in flight or upon impact with the turf. A control system receives sensor input defining divot location, shape, and depth, and regulates airflow, mist emission, and nozzle activation to deliver precise, volume-adjusted repair material. This coordinated approach enables accurate, repeatable, and self-regulated turf restoration with minimal human intervention.

Additional shortcomings of prior approaches are overcome, and additional advantages are provided through the provision of a modular turf repair and condition-management system configured for automated detection, filling, and monitoring of divots and turf surface irregularities. The system is mounted on a modular frame featuring mechanical and electrical interfaces for quick, tool-less attachment to a host vehicle. A hopper stores a dry repair material such as sand or seed, which is propelled by an air-assisted manifold through a series of conduits to a dispensing array comprising individually controlled nozzles. Co-located with the dispensing array, a liquid-mist subsystem operates in selectable modes, including dry, mist, binder, and growth, enabling delivery of atomized water, tackifier solution, or growth-promoting liquids. A control system dynamically regulates mist parameters, airflow, and material ratios in real time based on sensor input and vehicle telemetry, while maintaining a dry internal path for clog-free operation. The power interface links to the host vehicle for shared energy and data, creating a self-contained, intelligent, and easily retrofittable turf-repair module adaptable to various maintenance platforms. In operation, the power interface can be an electrical coupling between the host vehicle 210 and the control system 500.

Additional shortcomings of prior turf-maintenance systems are overcome, and additional advantages are provided through the provision of an integrated turf repair and condition-management system that combines coordinated aerial mapping, autonomous ground navigation, and precision material application. The system includes a ground unit comprising a hopper that stores a dry repair material such as sand, seed, or mixtures thereof, an air-assisted manifold that propels the repair material through multiple conduits, and a plurality of dispensing nozzles, each equipped with an individually controllable valve. A liquid-mist subsystem positioned near the dispensing nozzles emits atomized liquid—such as water, binder, or growth solution—into the propelled material plume so that the mist and dry material combine in flight or upon contact with the turf.

A control system synchronizes air propulsion, valve actuation, and mist emission based on detected divot geometry and the platform's ground speed, enabling highly precise and adaptive filling performance. The system further includes at least one aerial drone that performs aerial mapping of turf surfaces, capturing optical or multispectral data to locate divots and transmit geographic coordinates to the ground unit. A GPS-linked control interface associates each mapped divot with a corresponding repair record, ensuring traceability and accountability for every restoration event.

An analytics processor monitors turf regrowth using periodic imaging and environmental inputs to identify slow-healing or high-wear areas and generate predictive maintenance recommendations. A wireless communication module enables real-time synchronization between the aerial drone and the ground unit, allowing fully or semi-autonomous repair cycles to be executed without direct human operation. The remote data processing resource can comprise the analytics processor.

By merging aerial reconnaissance, geospatial analytics, and automated repair functions into one cohesive system, the present invention transforms turf management into a data-driven, closed-loop operation. The result is a significant improvement in repair accuracy, speed, and surface consistency, reducing manual labor and optimizing turf recovery outcomes compared to prior non-integrated or manually guided approaches System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

Figure 1:
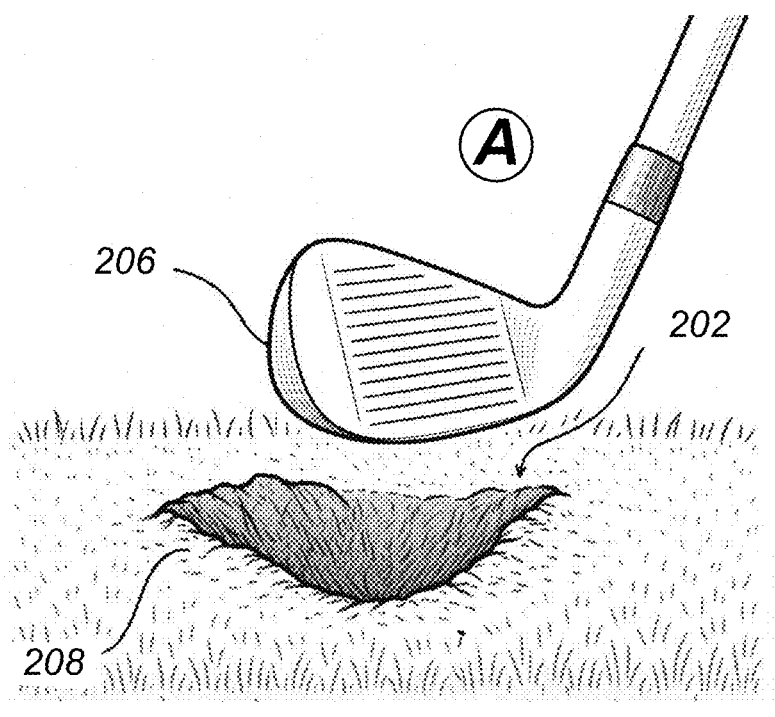
FIG. 1 illustrates one example of, in reference 'A', a divot, in reference 'B', a top view of a divot profile, and in reference 'C', a perspective view of a divot showing how a volume of earth has been displaced.
Figure 1:
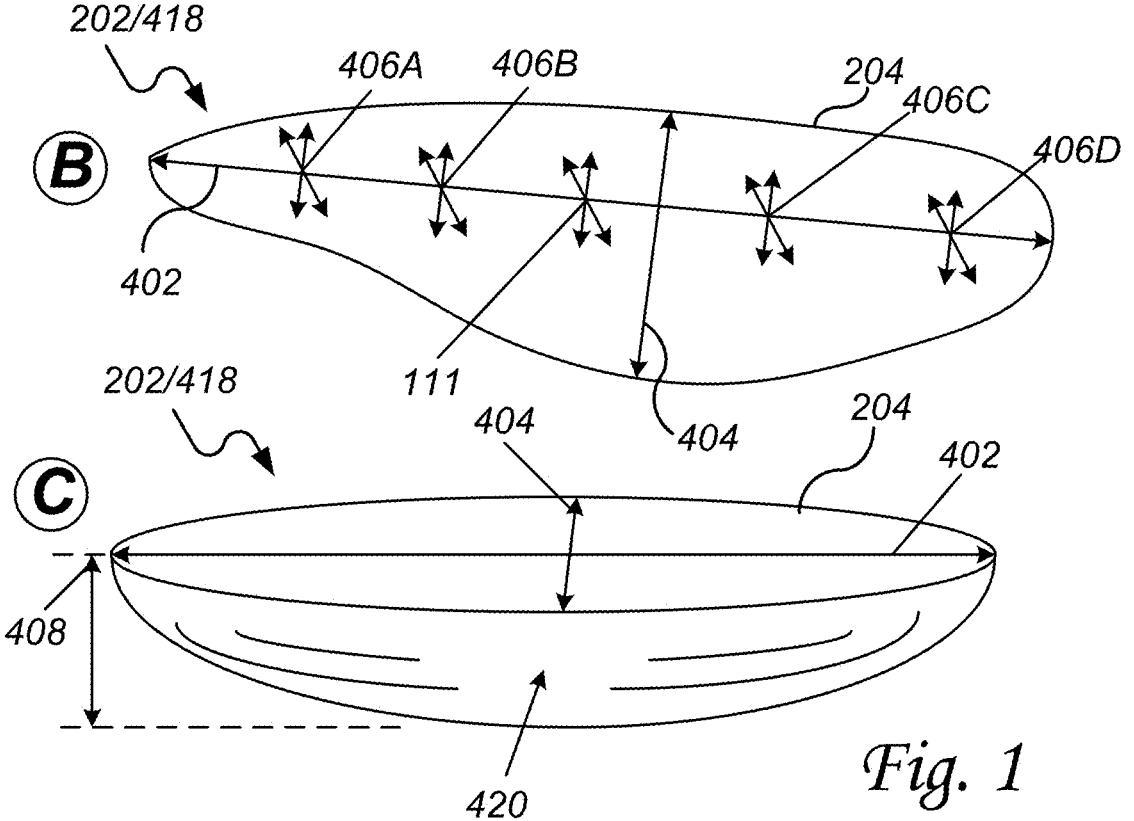

The detailed description explains the preferred embodiments of the invention, together with advantages and features, by way of example, with reference to the drawings.

DETAILED DESCRIPTION OF THE INVENTION

Divot formation on turfgrass surfaces represents one of the most persistent maintenance challenges faced by golf courses, athletic fields, and other landscaped grounds. Each time a club, shoe, or maintenance tool disrupts the turf, a localized volume of soil and vegetation is displaced, leaving behind a depression that exposes underlying soil and damages the root structure. Unrepaired divots dry quickly, impede regrowth, and negatively affect both the playability and aesthetic appearance of the surface. Traditional repair practices rely on human observation, manual identification of each divot, and hand-spreading of sand and seed mixtures to approximate the original surface contour. These manual methods are labor-intensive, inconsistent in fill quality, and difficult to verify.

Even in facilities employing mechanized spreaders or seeders, existing equipment typically dispenses uniform volumes of material without regard to the size, depth, or geometry of individual divots. This one-size approach results in significant material waste and incomplete repair, particularly in large-scale or high-traffic environments where hundreds of divots may form daily. Furthermore, current systems lack intelligent coordination between detection, delivery, and verification steps, preventing any closed-loop assurance that the repair is sufficient or that grass recovery is progressing normally.

The present invention addresses these longstanding deficiencies by introducing an intelligent turf repair and condition-management system that automates the detection, filling, and monitoring of divots and turf irregularities. In one aspect, the invention utilizes a hopper and air-assisted manifold to propel a dry repair material—such as a sand and seed mixture—through a network of conduits terminating in an array of dispensing nozzles. A liquid-mist subsystem positioned proximate to the nozzles emits a controlled mist into the material plume during discharge, allowing the liquid and dry material to mix either in flight or upon impact with the turf surface. The system's control architecture interprets data from a variety of sensors that measure divot geometry, environmental conditions, and vehicle speed, and dynamically regulates which nozzles in the array are activated and for how long. As a result, each divot receives a tailored fill volume and composition proportional to its shape and depth.

An advantage of the present invention over prior approaches lies in its ability to regulate both the precise dispense amount and targeted delivery location of the repair material. By employing an air-assisted propulsion manifold that conveys the repair material through a plurality of dispensing nozzles arranged in an array, the system can modulate airflow and valve timing to match the exact geometry and depth of each detected divot. This controlled pneumatic delivery enables each nozzle to function as an individually addressable outlet, activated only when its trajectory aligns with a measured void. In contrast, earlier auger-based or screw-feed dispensers extruded material at a fixed rate, relying solely on mechanical throughput and operator judgment. Such prior mechanisms tended to mound or scatter the material, leading to uneven fill density, over-filled divots, and irregular surface contours requiring manual correction. The air-assisted array of the present invention eliminates those deficiencies by producing a fine, directed plume that deposits the material in measured increments, allowing for uniform surface restoration and superior control of fill depth and compaction. This results in a higher quality repair with less material waste and reduced need for human intervention, reflecting a substantive technical improvement in automated turf-repair precision and consistency.

Beyond simple material delivery, the invention introduces intelligent environmental adaptation and operational modes that extend functionality across different maintenance contexts. When configured as a retrofit module attachable to a host vehicle, the system can operate in several modes: a dry mode for standard sand and seed dispensing, a mist mode that introduces atomized water to hydrate seed and reduce dust, a binder mode that applies a light tackifier to stabilize loose fill material, and a growth mode that atomizes a nutrient or biostimulant solution to accelerate turf regrowth after repair. These modes are selected and controlled by an onboard control system, which may also communicate with the host vehicle to obtain ground-speed and positioning data.

In further embodiments, the system integrates with autonomous vehicles or coordinates with aerial drones that perform aerial mapping and divot localization. The drone captures geospatial imagery and transmits divot coordinates to one or more ground-based repair units, each of which navigates to the specified location and performs an automated repair cycle. A cloud-linked analytics processor tracks regrowth trends, detects slow-healing or abnormal turf zones, and continuously refines repair parameters to improve subsequent fill accuracy and recovery performance.

Through this integrated combination of air-assisted material propulsion, intelligent liquid-mist modulation, and adaptive control informed by environmental and positional data, the present invention provides a closed-loop turf repair platform that not only fills divots with precision but also monitors and optimizes the healing of the turf surface over time. The result is a more consistent, efficient, and data-driven approach to turf maintenance that substantially reduces manual labor while enhancing surface quality and long-term sustainability.

In the present invention, the term "divot" is intended to mean a localized cavity, depression, or disruption of a turf surface caused by displacement of soil and vegetation due to an impact event such as a golf swing, cleat strike, or other mechanical disturbance.

In the present invention, the term "turf surface" is intended to mean a vegetated ground region comprising grass, soil, sand, or synthetic material forming the playable or landscaped area subject to maintenance by the turf repair and condition-management system.

In the present invention, the term "repair material" is intended to mean a dry, flowable particulate composition comprising sand, seed, soil, or combinations thereof, suitable for refilling and restoring a divot or surface irregularity.

In the present invention, the term "air-assisted manifold" is intended to mean a pneumatic distribution assembly configured to receive compressed air or gas and propel dry repair material through conduits toward one or more dispensing nozzles for controlled discharge.

In the present invention, the term "dispensing array" is intended to mean a plurality of independently controllable dispensing nozzles arranged laterally across the width of the ground unit to deliver localized, geometry-specific quantities of repair material and liquid mist.

In the present invention, the term "liquid-mist subsystem" is intended to mean a group of components including one or more pumps, valves, and mist nozzles configured to atomize and emit a liquid, such as water, binder, or growth solution, into the repair-material plume at or near the point of discharge.

In the present invention, the term "binder tackifier liquid" is intended to mean a low-viscosity adhesive or polymer solution applied in mist form to stabilize deposited repair material by lightly binding adjacent particles together.

In the present invention, the term "growth mode" is intended to mean a selectable operational mode of the liquid-mist subsystem configured to dispense a liquid formulation that promotes turfgrass regrowth following repair of a divot or surface irregularity. In the growth mode, the system atomizes and emits a grass-growth solution comprising at least one of a biostimulant, nutrient complex, or microbial accelerant. The liquid is applied either concurrently with or subsequent to the dispensing of the repair material, creating a localized microenvironment conducive to seed germination and turf recovery. The growth mode may be automatically triggered based on environmental or regrowth analytics, or manually selected by an operator through the control system interface.

In the present invention, the term "growth solution" is intended to mean a liquid composition containing nutrients, biostimulants, or microbial agents formulated to promote turfgrass regeneration and root establishment following divot repair.

In the present invention, the term "control system" is intended to mean one or more processors, memory, sensors, and actuator controllers configured to coordinate detection, dispensing, misting, and compaction functions in response to divot geometry, environmental data, and platform speed.

In the present invention, the term "ground unit" is intended to mean a mobile platform or subsystem mountable to a host or autonomous vehicle, housing the dispenser array, hoppers, manifold, and divot compactor assemblies that perform turf repair operations.

In the present invention, the term "aerial drone" is intended to mean an unmanned aerial vehicle equipped with optical or multispectral sensors and communication interfaces for detecting turf irregularities, mapping divot coordinates, and transmitting corresponding data to the ground unit or control system.

In the present invention, the term "divot model" is intended to mean a data structure comprising geometric parameters, coordinate position, and estimated fill volume associated with a detected divot, used by the control system to determine dispensing parameters.

In the present invention, the term "dispense mode" is intended to mean an operational state of the liquid-mist subsystem, including dry, mist, binder, or growth configurations, each governing liquid composition and flow behavior during turf repair.

In the present invention, the term "air-assisted repair" is intended to mean a process in which compressed air entrains and accelerates dry repair material for targeted deposition, optionally combined with an external mist stream for hydration or binding.

In the present invention, the term "autonomous operation" is intended to mean system functionality in which the ground unit and/or aerial drone navigate, detect, and perform repair actions without continuous human control, based on programmed logic and sensor feedback.

In the present invention, the term "direct communication link" is intended to mean a short-range wireless or wired data pathway between the computing device and the ground unit or aerial drone, enabling command and telemetry exchange independent of global network connectivity.

In the present invention, the term "estimated fill volume" is intended to mean the calculated mass or volumetric amount of repair material required to restore a detected divot to its nominal turf plane, as derived from sensor-based geometric measurements.

In the present invention, the term "analytics processor" is intended to mean one or more computational resources configured to process, correlate, and analyze sensor, environmental, and operational data to identify trends, evaluate turf regrowth performance, and predict high-wear zones based on historical and environmental information.

In the present invention, the term "GPS-linked control interface" is intended to mean a navigation and communication subsystem configured to associate divot coordinates received from an aerial drone or sensor system with real-time vehicle position data, thereby enabling synchronized ground-unit alignment and recorded repair event tracking.

In the present invention, the term "divot data" is intended to mean a dataset comprising positional coordinates, geometric dimensions, surface profile characteristics, and fill-volume estimates for one or more detected divots, used by the control system to determine dispensing parameters and schedule repair actions.

In the present invention, the term "remote data-processing resource" is intended to mean one or more cloud-based or network-connected computing servers configured to receive telemetry from the turf repair system, perform analytics or AI-driven inference, and store maintenance records, operational history, and performance data.

In the present invention, the term "wireless communication module" is intended to mean a transceiver subsystem capable of transmitting and receiving data between the ground unit, aerial drone, and remote data-processing resources using protocols such as Wi-Fi, Bluetooth, or cellular.

In the present invention, the term "computing device" is intended to mean a handheld, portable, or stationary computing platform such as a smartphone, tablet, or laptop configured to communicate with the control system for monitoring, dispatching, or reviewing repair operations.

In the present invention, the term "sensor feedback loop" is intended to mean an automated control cycle in which one or more sensors continuously provide real-time data to the control system, allowing dynamic adjustment of dispensing rate, mist composition, or compaction parameters.

In the present invention, the term "divot repair event" is intended to mean a single, timestamped operation in which a detected divot is filled, compacted, and optionally treated with liquid mist or growth solution, with associated operational data recorded in system memory.

In the present invention, the term "autonomous coordination cycle" is intended to mean a combined process in which an aerial drone identifies divots, transmits location data to the ground unit, and the ground unit performs corresponding repair actions without human intervention, maintaining synchronized operation through wireless communication.

In the present invention, the term "environmental sensor suite" is intended to mean a collection of sensors configured to measure ambient conditions such as wind speed, humidity, temperature, and light level, which data are used by the control system to adjust mist flow rate, droplet size, and repair-material distribution.

In the present invention, the term "liquid hoppers" is intended to mean one or more fluid reservoirs configured to store separate liquid compositions, including water, binder tackifier liquid, and growth solution, each fluidly coupled to a pump and manifold for selective dispensing through the liquid-mist subsystem.

In the present invention, the term "dispense nozzle array" is intended to mean a coordinated assembly of multiple dispensing nozzles arranged laterally across the width of the system, each nozzle comprising a repair-material outlet and a co-located mist nozzle, with activation controlled individually or in grouped patterns by the control system.

In the present invention, the term "divot compactor" is intended to mean a mechanical element or assembly positioned downstream of the dispensing array and configured to smooth and compress the deposited repair material, using rolling, vibration, or tamping action to restore the turf surface to its desired contour.

In the present invention, the term "air source" is intended to mean a compressor, fan, or equivalent pneumatic generator configured to deliver pressurized air to the air-assisted manifold for propelling the dry repair material through conduits toward the dispensing nozzles.

In the present invention, the term "combiner" is intended to mean an air-flow junction or venturi structure positioned between the repair-material hopper and the dispensing array, designed to entrain the dry repair material into the air stream generated by the air source for controlled, clog-free conveyance.

In the present invention, the term "mist nozzle" is intended to mean an atomizing outlet configured to emit a fine liquid spray of water, binder, or growth solution, positioned to intersect the repair-material plume external to the nozzle for precise, post-nozzle wetting.

In the present invention, the term "host vehicle" is intended to mean any powered mobile platform, such as a mower, cart, or tractor, configured with mechanical, pneumatic, and electrical interfaces that allow the turf repair and condition-management system to be mounted, powered, and controlled.

Turning now to the drawings in greater detail, it will be seen that in FIG. 1, there is illustrated one example of a divot formation and geometric reference model that provides the foundational context for operation of the turf repair and condition-management system 100. The figure shows, in reference 202, a divot formed within a turf surface 208, the divot 202 representing a cavity or depression caused by displacement of soil and vegetation following an impact event such as that made by a golf club 206 as a golfer 306 hits a golf ball on the turf surface 208 with a golf club 206. The perimeter 204 of the divot 202 defines the lateral boundary of the displaced region, which can be irregular depending on turf type and direction of golf club 206 motion.

In an exemplary embodiment, the divot 202 is analyzed in terms of its three-dimensional geometry relative to a horizontal reference line 402 and a vertical reference line 404 extending through the turf surface 208. A series of dimensional measurements, represented at 406A, 406B, 406C, 406D, and 406E, can be taken along various cross-sections of the divot 202 to define the curvature and edge gradient of the void. A depth measurement 408 is further determined by one or more optical, ultrasonic, laser, or other suitable sensors configured within or associated with the turf repair and condition-management system 100. In an exemplary embodiment, sensor data can be processed locally within control system 500 or remotely by the analytics processor 734 within data processing resource 702.

These geometric parameters collectively form a divot model 418, which includes data relating to the length, width, depth, and/or other features of the divot 202, as well as, optionally, its coordinate position derived from a GPS divot location 414. The model 418 can further incorporate soil-color analysis or infrared reflectivity data to characterize the composition and moisture level within the affected area. Once compiled, the divot model 418 is processed to determine an estimated fill volume 420, which represents the computed mass or volumetric quantity of repair material required to restore the turf surface 208 to the original horizontal plane 402.

In an exemplary embodiment, the divot model 418 and the estimated fill volume 420 form part of divot data 410 that may be transmitted between data processing resources 702, computing devices 732, local or remote control system 500, autonomous vehicles 212, aerial drone 214, and other data devices as may be required and/or desired in a particular embodiment. The divot data 410 can include the GPS divot location 414 and may be communicated between an aerial drone 214, configured with imagery and sensor systems, and an autonomous vehicle 212. The autonomous vehicle 212 can be equipped with a ground unit 216 that incorporates the turf repair and condition-management system 100. In operation, the drone 214 detects one or more divots 202 across the turf surface 208, generates corresponding divot data 410, and transmits that information to the autonomous vehicle 212 or other host vehicle 210 configured with a ground unit 216.

Responsive to receipt of the divot data 410, as illustrated by reference 412, the autonomous vehicle 212 dispatches or navigates to the identified GPS divot location 414. Upon arrival, the ground unit 216 performs a repair cycle in which the turf repair and condition-management system 100 delivers an air-propelled stream of dry repair material, optionally combined with a liquid mist 104/106/108 to restore the divot 202. This closed communication loop—linking aerial detection, coordinate transmission, and ground-level repair—enables a coordinated workflow that can occur autonomously or under supervisory control.

From a technical perspective, FIG. 1 establishes the spatial relationships and data parameters that allow the system to perform adaptive filling operations. The divot geometry measurements 204, 404, 406A-406E, and 408 are not abstract data but represent physically sensed attributes of a real-world cavity. These measurements are converted into modeling data and control signals that determine manifold air pressure, nozzle selection, and discharge duration, thereby governing the physical delivery of repair material. This transformation of sensor data into actuation control produces a tangible modification of the environment—the reformation of the turf surface 208—and therefore constitutes a specific and practical application of data processing within a physical repair system.

The advantages of this approach are significant when compared with prior approaches that rely on manual visual estimation. By using quantitative divot data 410 and the divot model 418, the system can proportionally match estimated fill volume 420 to the measured void, resulting in consistent surface restoration with reduced material waste. The incorporation of GPS divot location 414 within the model 418 also permits long-term monitoring and maintenance analytics, allowing repeated measurements to verify that grass regrowth is progressing normally. These combined features form the analytical and operational basis of the intelligent repair process described in subsequent figures, where the relationship between the divot geometry, the air-assisted manifold, and the control system 500 is further elaborated.

Figure 2:
FIG. 2 illustrates one example of, in reference 'A', grounds maintenance equipment towing a turf repair and condition-management system, and in reference 'B', an autonomous vehicle equipped with a turf repair and condition-management system.
Figure 2:
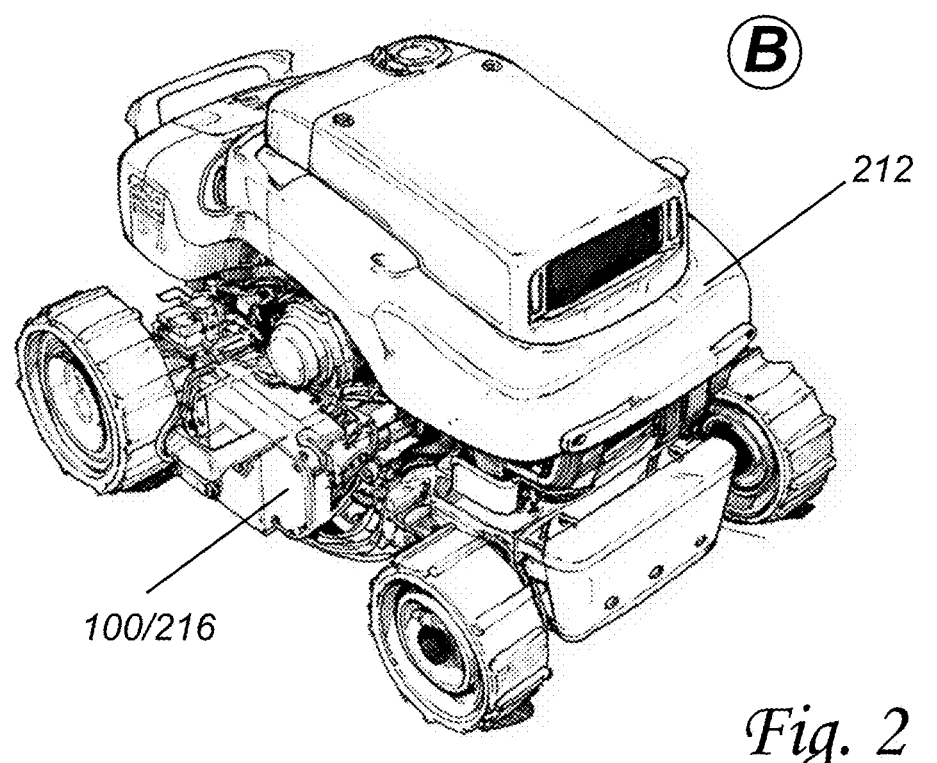

Referring to FIG. 2, there is illustrated one example of the integration of the turf repair and condition-management system 100 with different mobile platforms that enable either manual or autonomous deployment across a turf surface 208. In reference 'A', a host vehicle 210—which can be a utility vehicle, ride-on mower, cart, or other grounds-maintenance machine—is shown towing a ground unit 216 that houses the turf repair and condition-management system 100. In reference 'B', an autonomous vehicle 212 is illustrated as incorporating the ground unit 216 that houses the turf repair and condition-management system 100 directly within its chassis. Both arrangements demonstrate flexible configurations by which the repair system can be mobilized across a turf surface 208 to perform localized divot 202 restoration and turf surface conditioning.

In an exemplary embodiment, the ground unit 216 can be mechanically coupled to the host vehicle 210 through a quick-attach hitch interface and operate independently or be powered by the host's electrical or hydraulic system. Pneumatic coupling allows the air-assisted manifold 114 of the system 100 to receive regulated compressed air supplied by the host vehicle 210, while an electrical coupling provides power and communication channels to the system's control system 500 and other electrical components and systems. In this configuration, the host vehicle 210 may act as a prime mover, positioning the ground unit 216 across the turf surface 208 while the control system 500 coordinates sensing, material delivery, and mist emission.

The divot compactor 132 is configured to smooth and compress the repair material after the divot 202 has been filled. In an exemplary embodiment, the divot compactor 132 can include one or more rotating drums, rollers, or vibratory plates mounted behind the dispensing array so that each repaired region passes immediately beneath it as the vehicle advances. The divot compactor 132 may employ rolling, vibration, tamping, or other suitable approaches to ensure that the deposited material conforms to the surrounding turf plane and achieves appropriate packing density. The control system 500 can synchronize the engagement of the divot compactor 132 with the discharge cycle, adjusting downward force, vibration frequency, or rolling pressure according to the measured divot depth and the operational mode of the liquid-mist subsystem. When operating in the binder or growth mode, for example, the divot compactor 132 can apply reduced pressure to avoid displacing the wetted surface while still consolidating the fill to promote adhesion and moisture retention.

The divot compactor '132 may include embedded force sensors or gyroscopic feedback elements that measure applied compression force and tilt angle during the smoothing process. The resulting data is transmitted to the control system 500 to verify adequate compaction and surface uniformity. This feedback is compared to baseline models of optimal surface rebound characteristics, ensuring that the repaired divot exhibits consistent playability and visual uniformity with surrounding turf.

The autonomous vehicle 212 embodiment provides a self-contained variant in which the ground unit 216 and the turf repair and condition-management system 100 are integrated within a single platform. The autonomous vehicle 212 can include a propulsion drive, steering actuators, an onboard battery pack, and navigation electronics configured to interpret geospatial coordinates received from an aerial drone 214 or other mapping source. The autonomous vehicle 212 thereby eliminates the need for a human operator, instead following a repair path determined from the divot data 410 or GPS divot location 414 transmitted by the drone 214, data processing resource 702, computing device 732, or other suitable data processing device.

In operation, the aerial drone 214 can be configured with optical, infrared, multispectral sensors, or other suitable imagery sensors capable of detecting surface irregularities and/or turf conditions that correspond to divots 202. When a divot 202 is identified, the aerial drone 214 can record its coordinates and associated dimensional attributes as described with respect to FIG. 1. That divot data 410 can then be relayed wirelessly to either the host vehicle 210 or the autonomous vehicle 212, depending on the operating mode. The receiving platform transmits the divot data 410 to the control system 500 located within the ground unit 216, which then plans a repair action that includes nozzle activation sequence, air-pressure profile, liquid-mist selection (no mist, water, binder tackifier, growth-solution, or other suitable liquid), and divot repair compaction engagement by way of divot compactor 132.

In an exemplary embodiment, the ground unit 216 can contain a local processing controller synchronized with the main control system 500, enabling real-time coordination between vehicle motion and discharge timing. As the host vehicle 210 or autonomous vehicle 212 moves across the turf surface 208, the system 100 calculates a lead-distance compensation factor that offsets vehicle velocity to ensure the material plume reaches the correct location of each divot 202. This predictive control feature is particularly valuable on variable terrain or when operating in wind conditions, allowing consistent material deposition even under dynamic environmental factors.

The mechanical relationship between the vehicles and the ground unit 216 provides an essential advantage: the air-assisted manifold and nozzle array can be maintained at a constant operating height relative to the turf surface 208, independent of suspension movement or pitch angle of the towing vehicle. The coupling system may include a gimbal or float-mount mechanism that allows limited vertical articulation, ensuring the nozzle array maintains the proper stand-off distance for accurate plume formation and mist mixing. Maintaining this consistent geometry is critical for uniform fill quality and for ensuring the liquid-mist subsystem achieves proper atomization and adhesion of the repair material to the divot walls.

Another distinguishing feature is the integration of vehicle telemetry into the control architecture. When coupled to the host vehicle 210, the system 100 can receive ground-speed and positional data through the vehicle's communication bus. The control system 500 then dynamically adjusts manifold pressure, nozzle-valve timing, and mist emission rate proportionally to the vehicle's forward speed. In the autonomous configuration, similar feedback is derived from wheel-encoders, Doppler radar, or LiDAR-based odometry systems within the autonomous vehicle 212. This closed-loop regulation ensures that each divot 202 is repaired with a consistent fill density regardless of motion dynamics, representing a substantial technical improvement over prior approaches that lack velocity compensation or adaptive control.

The relationship among the aerial drone 214, autonomous vehicle 212, and ground unit 216 demonstrates a coordinated multi-agent system in which divot data collected by one platform triggers physical action by another. The aerial drone 214 supplies mapping and detection intelligence, the autonomous vehicle 212 interprets the geospatial information and navigates to the site, and the ground unit 216 executes the repair sequence using the air-assisted manifold and liquid-mist subsystem. This collaboration produces a measurable transformation of the physical environment— precise restoration of the turf surface 208—achieved through algorithmic control and sensor-driven actuation. Such an arrangement provides a practical application of data processing within a tangible mechanical process, reinforcing the technical nature of the invention under statutory subject-matter analysis.

In an exemplary embodiment, the drone-to-ground communication may employ encrypted radio or Wi-Fi links allowing bidirectional data flow. The ground unit 216 can send completion confirmations and post-repair imagery back to the drone 214, enabling immediate verification or deferred analytics through a remote computing system. The invention thus creates a closed-loop repair ecosystem, spanning aerial reconnaissance, autonomous navigation, and precision material deposition, which collectively yield improved efficiency, consistency, and quality in turf maintenance operations.

Figure 3:
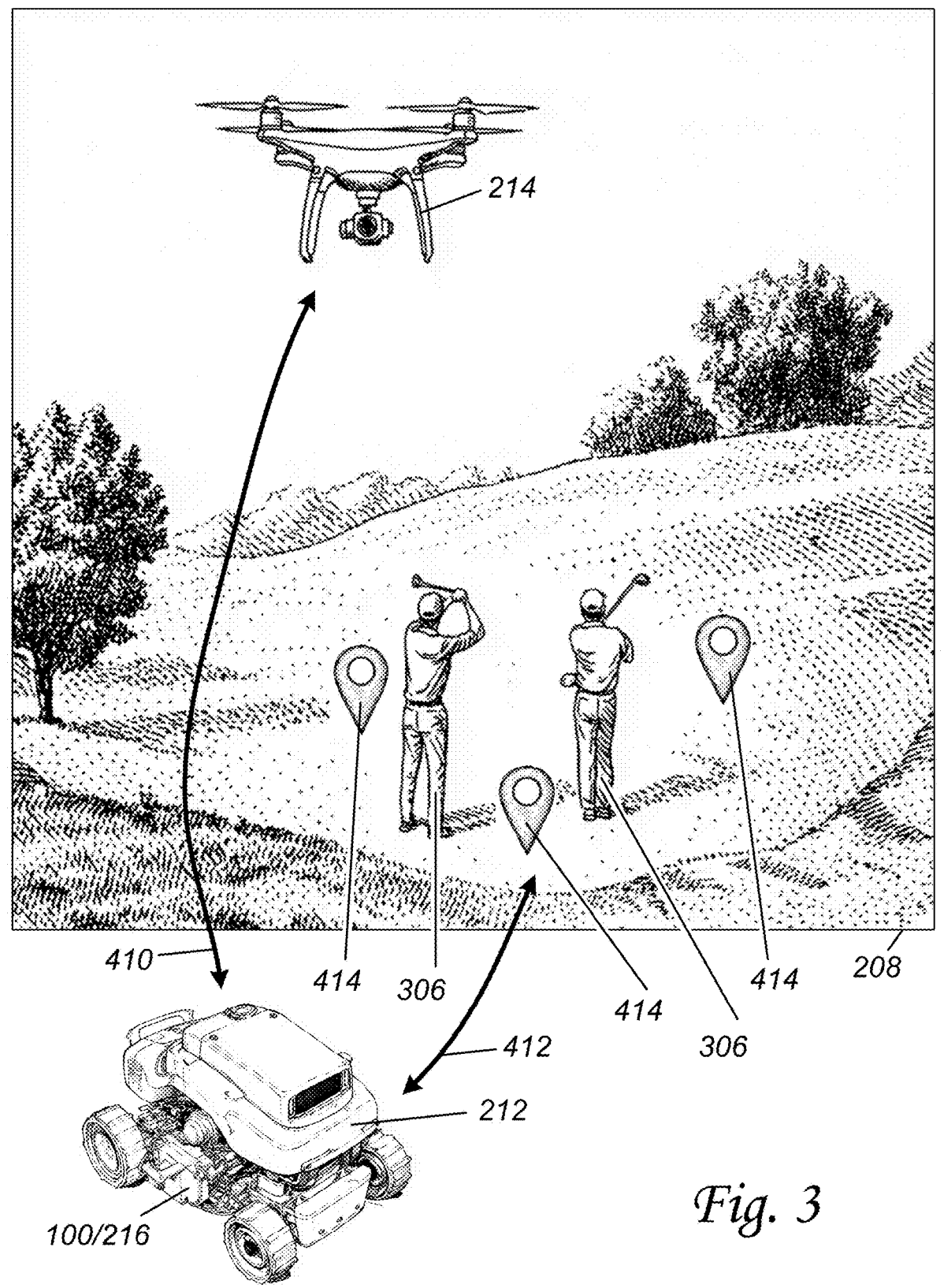
FIG. 3 illustrates one example of an aerial drone performing aerial mapping of a turf area, and an autonomous vehicle being dispatched to repair divots located by the aerial drone at the mapping coordinates.

Referring to FIG. 3, there is illustrated one example of an aerial drone 214 performing aerial mapping of a turf area and coordinating with an autonomous vehicle 212 configured with a ground unit 216, the ground unit 216 being equipped with the turf repair and condition-management system 100. The drone 214, the autonomous vehicle 212, and the ground unit 216 operate cooperatively to locate, analyze, and repair a plurality of divots 202 formed within the turf surface 208.

In an exemplary embodiment, the aerial drone 214 can comprise a multi-rotor or fixed-wing platform fitted with optical, infrared, or multispectral imaging sensors. These sensors capture high-resolution imagery of the turf surface 208 and can detect deviations in surface reflectivity, shadowing, or color that correspond to the perimeter 204 and depth 408 of individual divots 202. As the drone 214 traverses the area, its onboard processor generates georeferenced surface-elevation maps aligned to the horizontal reference line 402 and vertical reference line 404, identifying localized depressions that exceed a defined threshold. The result is a dataset containing multiple divot models 418, each including measured geometry 406A-406E, associated GPS divot location 414, and an estimated fill volume 420 computed from the sensed geometry.

The generated dataset constitutes divot data 410, which the drone 214 transmits wirelessly to the autonomous vehicle 212 or to a nearby base station. The transmission can occur through an encrypted radio, Wi-Fi, or cellular communication link, ensuring that each data packet includes a timestamp, location coordinate, and diagnostic metadata. Upon receiving the divot data 410, the autonomous vehicle 212 initiates a response sequence 412, in which it dispatches or navigates itself to the identified GPS divot locations 414. The control system 500 of the ground unit 216 interprets the incoming data, correlates the divot coordinates to its own local positioning system, and generates an optimized traversal path that minimizes travel distance while ensuring timely repair of each detected divot 202.

In an exemplary embodiment, the drone 214 may also perform an environmental assessment during flight, capturing temperature, humidity, and wind data relevant to the dispensing conditions of the repair material. These environmental parameters can be embedded within the divot data 410 so that the control system 500 can adjust the manifold pressure, mist-flow rate, or binder concentration accordingly. This closed data loop ensures that the repair operation dynamically adapts to changing environmental factors such as crosswind or surface moisture, improving deposition accuracy and adhesion quality.

The autonomous vehicle 212, after receiving and processing the divot data 410, deploys its integrated turf repair and condition-management system 100. The air-assisted manifold propels a dry repair mixture through the dispense nozzles 124 arranged in an array within the dispensing array 102, while the liquid-mist subsystem emits water, binder, or growth solution as appropriate. Following discharge, the divot compactor 132 smooths and compresses the repaired region, thereby restoring the surface contour of the turf surface 208. Completion status, along with any post-repair optical imagery, can then be transmitted back to the drone 214 or a remote monitoring station for verification.

In an exemplary embodiment, the turf repair and condition-management system 100 can include a plurality of dispense nozzles 122 organized within the dispense array 102 that are configured to deliver the repair material and associated mist in a coordinated and air-assisted manner. Each dispense nozzle 122 can comprise at least one repair material dispense nozzle 124 and one or more mist nozzles 126, the combination forming a coaxial or adjacent arrangement that allows both dry and liquid components to converge in a controlled manner during discharge. The repair material dispense nozzle 124 can be fluidly connected to an air-assisted manifold configured to propel an air-assisted repair material 112, such as a sand and seed mixture, at a controlled velocity through the nozzle outlet. The mist nozzles 126 can be fluidly connected to a liquid circuit coupled with one or more liquid hoppers containing water, binder, or growth-enhancing solutions.

During operation, the control system 500 coordinates the simultaneous or sequential activation of the repair material dispense nozzle 124 and the mist nozzles 126 based on divot geometry and the selected mode of operation. In a dry mode, only the repair material dispense nozzle 124 is activated, propelling a measured amount of dry material 112 into the divot. In a mist mode, the mist nozzles 126 emit atomized water into the plume of propelled repair material, causing a mix in flight or upon impact, wetting that hydrates seed particles and minimizes airborne dust. In a binder mode, the mist nozzles 126 can emit a low-viscosity tackifier or binder that partially coagulates the sand and seed mixture upon impact, forming a lightly bonded fill that resists erosion. In a growth mode, a nutrient or biostimulant solution can be emitted through the mist nozzles 126, coating the fill layer to promote accelerated turf regeneration.

The integration of the repair material dispense nozzle 124 and mist nozzle 126 within the unified dispense nozzle 122 provides significant technical advantages over prior approaches that relied on mechanically driven augers or singular orifices. By using air-assisted propulsion, the present system can regulate both velocity and mass flow independently of gravity or auger feed rate. Moreover, the ability to atomize and inject liquid post-nozzle ensures that the internal manifold remains dry, preventing clogging and simplifying maintenance. The nozzle array can be arranged across the width of the system 100 such that each dispense nozzle 122 is individually addressable, allowing the control system 500 to selectively activate only those nozzles that align with detected divots. This targeted delivery approach minimizes material waste and eliminates the mounding behavior characteristic of auger-type dispensers, providing precise and uniform surface restoration even at varying ground speeds or environmental conditions.

A further advantage of the present invention is that the repair material 112 is dispensed in a substantially dry state through the repair material dispense nozzles 124, enabling the air stream from the air-assisted manifold to guide precise quantities of material through the system without clumping or agglomeration. By maintaining a dry delivery pathway throughout the manifold and conduit network, the system avoids the buildup and flow interruptions that are common in prior approaches where water or other liquids were intermixed upstream. The repair material thus remains freely flowable and responsive to real-time control of air pressure and valve timing, allowing accurate metering of the dispensed volume corresponding to the measured geometry of each divot 202.

In an exemplary embodiment, the liquid emitted from the mist nozzles 126 is introduced such that the mist stream intersects the repair material plume externally to the respective nozzle outlets, rather than being combined internally within the manifold. This external mixing architecture permits the liquid mist to envelop and partially hydrate the propelled dry material 112 in flight or immediately upon impact with the turf surface 208. The result is uniform coating and adhesion of the material to the divot walls without compromising internal flow characteristics or clogging the conduits. Moreover, by adjusting mist droplet size, flow rate, and angle of convergence relative to the material plume, the control system 500 can fine-tune surface moisture and compaction conditions for different operational modes, including dry, mist, binder, and growth applications. This external-mixing approach represents a critical improvement over prior mechanical and auger-fed systems, which lacked the ability to independently control air flow, solid flow, and liquid atomization, and therefore could not achieve the same precision or consistency in divot filling and stabilization.

Technically, FIG. 3 demonstrates how aerial and ground components are integrated into a single intelligent ecosystem. The drone 214 provides high-resolution detection and mapping; the autonomous vehicle 212 interprets that data and executes localized mechanical repair through the ground unit 216; and both systems maintain bidirectional communication to confirm completion and update operational records. This configuration transforms digital image data into real-world mechanical actions that alter the state of the turf surface 208, thereby establishing a concrete and practical application of sensing and control technology rather than an abstract data-analysis routine.

In contrast to prior approaches in which human operators manually identify and repair divots, the coordinated drone-and-vehicle operation of the present invention enables scalable, repeatable, and verifiable repair across large playing surfaces. The system's ability to translate geospatially tagged sensor data directly into pneumatic and mechanical actuation represents a technical advancement in the automation of turf maintenance. By uniting airborne imaging, ground-level precision dispensing, and post-repair verification within a single control framework, the invention achieves a degree of accuracy and autonomy previously unattainable in turf-repair operations, offering reduced labor cost, improved surface uniformity, and consistent long-term playability.

Figure 4:
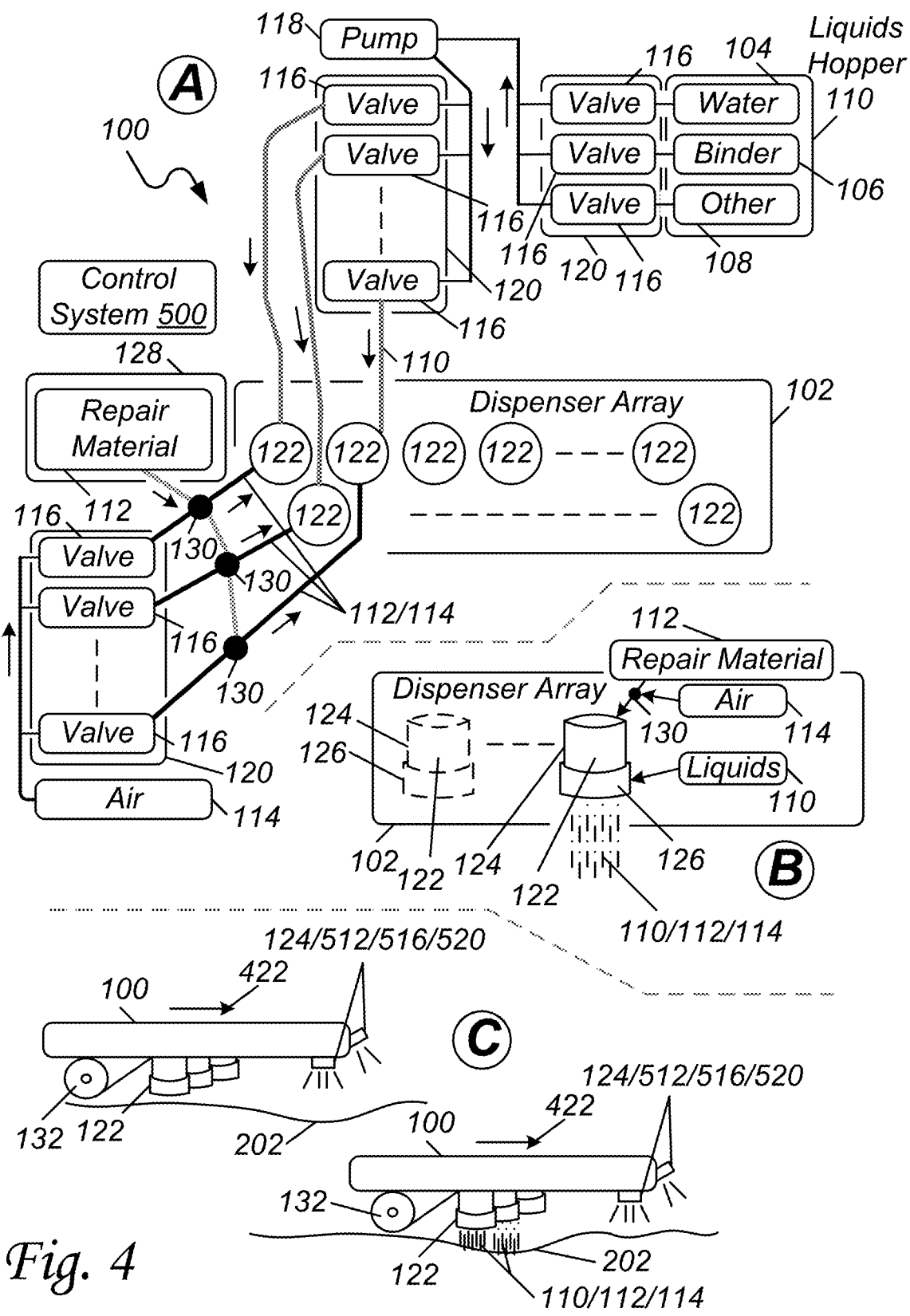
FIG. 4 illustrates one example of a turf repair and condition-management system block diagram.

Referring to FIG. 4, there is illustrated one example of the internal structure and subsystem relationships of the turf repair and condition-management system 100. Reference 'A' illustrates a system block diagram, reference 'B' illustrates the dispenser array 102, and reference 'C' illustrates the turf repair and condition-management system 100 moving 422 first detecting and measuring a divot 202 and then repairing the divots as it moves across the turf surface 208.

In an exemplary embodiment, the turf repair and condition-management system 100 can include a dispenser array 102, a liquid hopper 110 which comprises water 104, a binder tackifier liquid 106, or other liquids 108, and a repair material hopper 128 which comprises sand and/or seed compositions in a dry form (referred to as repair material 112) to repair the divots 202. Additionally, the turf repair and condition-management system 100 can include an air source 114, one or more manifolds 120, a network of valves 116 and pumps 118, a plurality of dispense nozzles 122, each of which can comprise a repair materials dispense nozzle 124 and a mist nozzle 126, and a divot compactor 132 positioned downstream of the dispensing array 102 section. The arrangement of these components enables coordinated air-assisted propulsion of dry repair material 112 and atomized liquid mist to restore a divot 202 within a turf surface 208 with precision and repeatability.

In an exemplary embodiment, the dispenser array 102 comprises a series of dispense nozzles 122 arranged laterally across the width of the ground unit 216 so that the dispenser array 102 can cover a substantial swath of the turf surface 208 during a single pass. Each dispense nozzle 122 comprises at least one repair material dispense nozzle 124 for dispensing air-assisted repair material 112 and at least one mist nozzle 126 for dispensing one or more liquids from liquid hopper 110 that are positioned to discharge converging streams which meet externally beyond the nozzle outlets. During operation, select ones of the dispense nozzles 122 are activated when the system 100 passes proximate to a detected divot 202 for a calculated dwell time sufficient to deliver the required quantity of repair material 112 into the divot 202. Dispense nozzles 122 not located near a divot remain inactive, allowing the array 102 to traverse large surface areas efficiently while delivering localized, geometry-specific filling. This selective activation of nozzles in an array pattern represents a key functional distinction from prior approaches in which auger or chute-type spreaders continuously dispensed material regardless of surface topology.

The repair material hopper 128 is configured to store the repair material 112, which can include sand, seed, or other granular mixtures suitable for turf restoration. The repair material 112 is maintained in a dry, free-flowing state and metered toward the one or more combiners 130, which merge the repair material 112 with a high-velocity airstream provided by the air source 114. The air source 114 can be realized as an air compressor, compressed gas tank (air, nitrogen, other), turbine, or fan assembly capable of generating controlled airflow pressure to entrain and propel the repair material 112 through the internal conduits toward the repair material dispense nozzles 124. The use of air assistance rather than mechanical conveyance eliminates the shear and compaction forces associated with auger-based feeders, thereby preserving consistent particle flow and preventing clumping or blockage within the manifold 120.

The combiner 130 functions as a transition interface where the pressurized airflow intersects the metered feed of repair material 112. By regulating the air-to-material ratio, the control system 500 can vary the mass-flow rate to match the calculated estimated fill volume 420 of each divot 202. The resulting mixture remains substantially dry and suspended in the air stream until ejected through the repair material dispense nozzles 124. Because the mist nozzles 126 introduce their atomized liquid streams externally, at the point of plume convergence, the internal pathways of the manifold 120 and conduits remain free of moisture, maintaining low frictional resistance and reducing maintenance frequency.

In some embodiments, the air-assisted manifold 120 incorporates dynamic pressure balancing across each conduit using electronically actuated regulators to maintain consistent repair-material velocity irrespective of the number of active dispensing nozzles 122. This prevents material drop-off at the distal end of the array and maintains uniform deposition across wide turf surfaces. The combiner 130 can include a converging-diverging throat geometry that creates a venturi effect, enhancing material entrainment while minimizing backflow. This configuration enables precise metering of repair material and mitigates clogging-a frequent failure mode of auger-based or gravity-fed approaches.

The liquid hoppers 110 houses one or more liquid reservoirs, each containing a selectable liquid such as water 104, binder tackifier liquid 106, or other liquids 108, including turf-growth solutions or nutrient formulations. Each reservoir is connected via fluid lines to an independently controlled pump 118, which is electronically actuated by a pump controller 526 within the control system 500. The pump 118 meters flow to the manifold 120 and onward to the associated mist nozzles 126. Similarly, one or more valves 116, actuated by a valve controller 528, regulate airflow and liquid flow to individual dispense nozzles 122. The manifold 120 thereby serves as a central distribution node that selectively channels pressurized air, gas, or liquid to each dispense location in real time according to control commands. Activation and dispense of liquid from the liquid hoppers 110 occur only through the mist nozzles 126 that correspond to active dispense nozzles 122. In this regard, the system does not broadcast or atomize liquid over a broad area of turf but rather directs the mist exclusively toward the repair-material plumes emitted from those dispense nozzles 122 that are engaged in active divot repair.

In an exemplary embodiment, the liquid-mist subsystem 126 further comprises a micro-blending chamber and inline concentration sensors, allowing automated dilution or enrichment of binder or growth solutions in real time based on environmental data such as temperature and humidity. The control system 500 uses this feedback to maintain optimal droplet adhesion and evaporation rate. This closed-loop modulation of droplet density and liquid composition enables stable adhesion of the repair material without over-saturation of the turf surface.

In an exemplary operational sequence, the control system 500 interprets geometric data obtained from sensors or remote divot data 410 and determines which nozzles 122 should be activated and for what duration. The manifold 120 then directs compressed air from the air source 114 through selected conduits, carrying dry repair material 112 from the hopper 128 through the repair material dispense nozzles 124. Simultaneously, one or more of the mist nozzles 126 emit atomized liquid—water 104 for hydration, binder 106 for cohesion, or growth liquid 108 for turf stimulation—such that the liquid plume intersects the dry material externally beyond the nozzle outlets, effectively mixing in flight or upon impact. This external mixing produces a precisely wetted repair composition that settles into the divot 202 without clogging internal passages or over-saturating the surrounding turf.

Downstream of the dispenser array 102, the divot compactor 132 is positioned to smooth and compress the filled region immediately after deposition. The divot compactor 132 can operate through rolling, vibration, tamping, or other suitable mechanical means to ensure that the restored area is level with the surrounding turf surface 208 and that the fill material achieves proper density. The divot compactor 132 engagement pressure or vibration amplitude can be automatically adjusted by the control system 500 based on divot depth 408 or the selected operational mode of the liquid-mist subsystem. This integration of deposition and mechanical finishing produces a continuous repair sequence that results in uniform, durable, and play-ready turf conditions without additional manual intervention.

In an exemplary embodiment, the control system 500 can execute a multi-stage fill sequence to optimize divot 202 repair quality and surface integration. During a first stage, the air-assisted manifold 120 propels a base layer of the dry repair material 112 through selected dispense nozzles 122 to establish foundational fill and geometric alignment within the divot 202. Following this, the control logic actuates the valve 116 and pump 118 to trigger the liquid-mist subsystem 126 in either the binder or mist mode, applying a controlled spray of water 104 or binder tackifier 106 over the freshly filled base layer. This secondary application forms a cohesive seal, reducing particle displacement and enhancing compaction strength once the divot compactor 132 engages. Additional passes can incorporate fine mist or nutrient growth liquids 108, as directed by the control system 500, to improve seed hydration and accelerate turf recovery. This layered approach provides a more uniform, resilient, and long-lasting divot restoration compared with single-stage or continuous-feed dispensing methods of prior approaches.

In another exemplary embodiment, the optical verification module 520 can provide real-time visual and depth feedback to confirm completion of each stage of the multi-stage fill sequence. After the initial base layer of dry repair material 112 has been dispensed, the module captures post-fill imagery and generates a depth contour map of the filled divot 202 relative to the surrounding turf surface 208. This data is transmitted to the control system 500, which compares the detected profile to a precomputed target model for that specific divot 202. If the fill volume or compaction density is below threshold, the control system 500 can initiate an additional localized discharge of repair material or trigger a brief binder or mist cycle to achieve proper leveling. Following compaction by the divot compactor 132, the optical verification module 520 performs a secondary scan to verify that the surface profile conforms within acceptable tolerance. This adaptive feedback mechanism enables closed-loop correction and ensures that each divot 202 achieves consistent restoration quality without manual intervention, thereby improving precision and repeatability across diverse turf conditions.

In a further exemplary embodiment, the optical verification module 520 can interface with the remote data processing resource 702, which can comprise an analytics processor 734 via the global network 700 to continuously improve system-wide performance through data aggregation and machine-learning feedback. Each post-fill verification scan—containing imagery, surface-contour maps, and repair success metrics—is uploaded to a centralized database 706A where it is time-stamped, geotagged, and correlated with prior repair events under similar environmental conditions. The analytics processor 734 applies feature extraction and trend analysis to identify correlations between local fill parameters, such as nozzle timing, mist ratio, and compaction force, and subsequent turf regrowth performance. Insights derived from this analysis are transmitted back to the control system 500, refining the predictive models that govern divot fill volumes, binder concentration, and sequencing logic. Over successive operation cycles, this cloud-enhanced feedback structure transforms each repair event into a learning instance, allowing the turf repair and condition-management system 100 to autonomously evolve its dispensing strategy for greater precision, efficiency, and biological effectiveness across varying turf environments.

In an additional exemplary embodiment, coordination between the local control system 500 and the remote data processing resource 702, which can comprise an analytics processor 734, enables a hybrid intelligence architecture in which immediate operational adjustments and long-term optimization function in concert. The control system 500 performs real-time inference locally, using embedded machine-learning models to select nozzle-activation patterns, airflow intensities, and liquid-mist ratios responsive to each detected divot 202. Concurrently, summarized telemetry—including localized fill accuracy, environmental sensor data, and post-verification imagery from the optical verification module 520—is streamed through the global network 700 to the remote data processing resource 702, which can comprise an analytics processor 734. The remote processor aggregates and evaluates these datasets across multiple ground units 216 and aerial drones 214 operating at different locations, identifying macro-level wear trends and efficiency patterns. Updated dispensing heuristics and route-prioritization maps are then transmitted back to the control system 500, allowing subsequent repair missions to begin with an optimized baseline model. This collaborative decision-making loop ensures that both local precision and fleet-wide performance continuously improve, establishing a distributed, learning-based maintenance ecosystem that goes beyond simple automation to deliver adaptive intelligence over time.

The design of the system 100 yields several key advantages. The use of dry, air-entrained repair material 112 allows precise volumetric metering and eliminates internal moisture-induced clumping common in auger-fed systems. The external convergence of the liquid mist and repair material plumes ensures uniform coating and adhesion at the surface while keeping the manifold 120 dry, minimizing downtime and simplifying maintenance. The individually addressable nozzles 122 within the dispenser array 102 enable selective operation synchronized to detected divot coordinates, preventing material waste and avoiding the uneven mounding characteristic of prior mechanical dispensers. By combining pneumatic transport, liquid atomization, and post-fill mechanical compaction within a single coordinated system, the turf repair and condition-management system 100 achieves a measurable physical transformation of the playing surface-a tangible result confirming its practical, non-abstract technological improvement over prior turf-maintenance approaches.

Figures 5, 6:
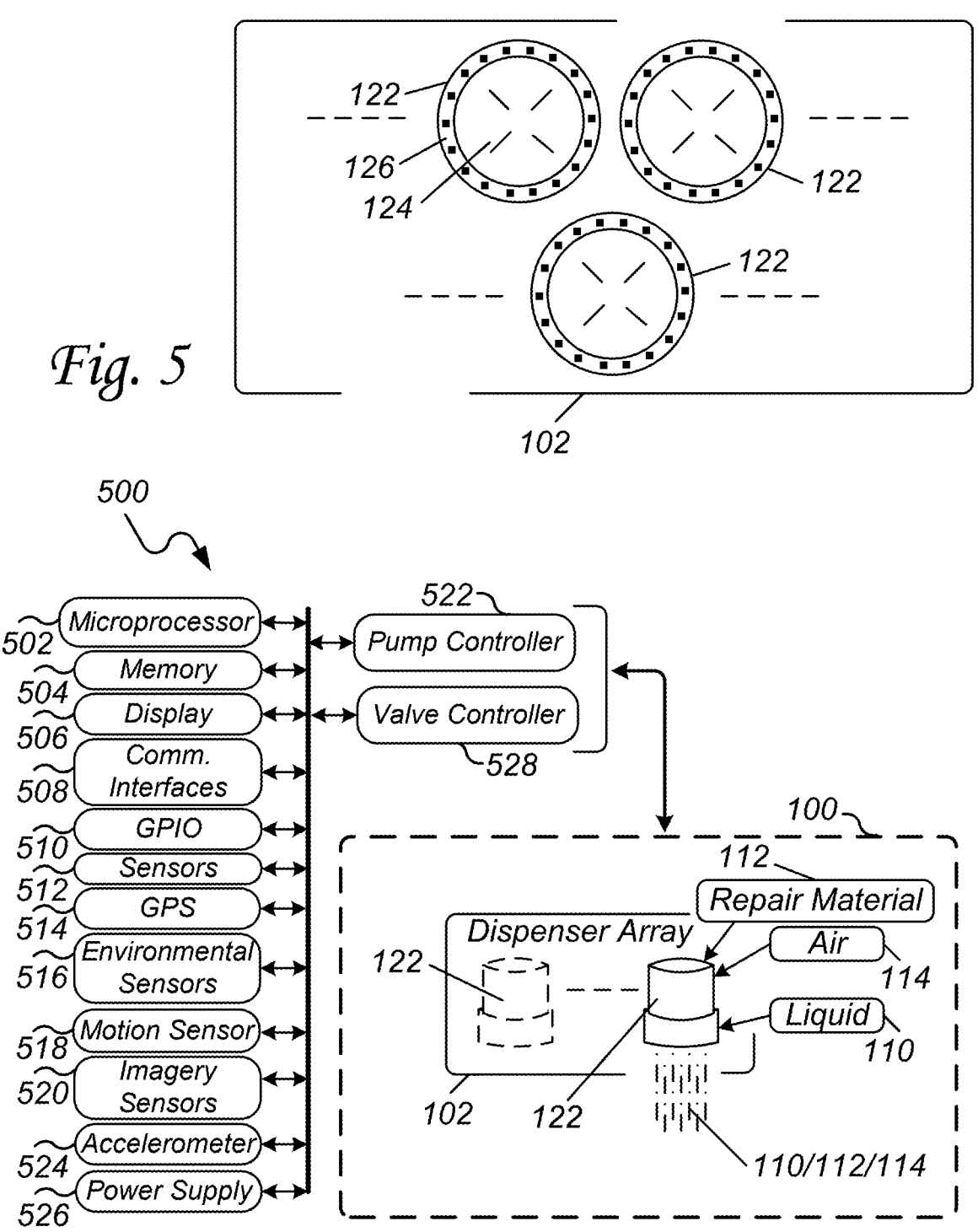
FIG. 5 illustrates one example of a dispenser array nozzle configuration.
FIG. 6 illustrates one example of a control system block diagram.

Referring to FIG. 5, there is illustrated one example of a dispenser array 102 of the turf repair and condition-management system 100, showing the relationship among a plurality of dispense nozzles 122, each comprising a repair material dispense nozzle 124 and one or more mist nozzles 126. The dispenser array 102 extends laterally across the working width of the ground unit 216 so that it can traverse a broad section of the turf surface 208 in a single pass while still delivering pinpointed application of the repair material 112. Each dispense nozzle 122 can be individually addressable and electronically actuated under the command of the control system 500, enabling precise modulation of discharge timing and duration in synchronization with the vehicle's position and velocity.

In an exemplary embodiment, the repair material dispense nozzles 124 are fluidly connected to conduits leading from the air-assisted manifold 120, which receives pressurized airflow from the air source 114. The air stream entrains the dry repair material 112 supplied from the repair material hopper 128 and delivers it through the repair material dispense nozzle 124 as a high-velocity plume. The mist nozzles 126, positioned adjacent to or concentrically around the outlets of the repair material dispense nozzles 124, are fluidly connected to the liquid hoppers 110 and are independently controlled to emit atomized water 104, binder 106, or other liquids 108, such as turf-growth solutions. The angular orientation and spacing of each mist nozzle 126 relative to its corresponding repair material dispense nozzle 124 can be calibrated so that the liquid mist intersects the propelled repair material plume at a controlled convergence zone external to the nozzle tips. This external-mixing configuration provides consistent coating of the particles while maintaining a dry internal conduit network and eliminating the risk of clogging or pressure loss.

The dispenser array 102 may incorporate evenly spaced rows of dispense nozzles 122 configured to partially overlap in coverage so that each nozzle's plume boundary merges with its adjacent neighbor. The overlap ensures uniform restoration coverage without creating ridges or gaps between filled regions. The control system 500 can dynamically adjust which dispense nozzles 122 are activated based on the divot model 418 and GPS location 414 received from the drone 214 or onboard sensors. In this way, only those nozzles directly aligned with a detected divot 202 are energized, while neighboring nozzles remain inactive, conserving both material and liquid. The duration of activation and the corresponding air-pressure level can be varied to deliver a proportional mass of repair material 112 consistent with the estimated fill volume 420 of each divot.

Because the dispenser array 102 integrates the air-assisted repair-material system and the liquid-mist subsystem at the nozzle level, the control system 500 can execute highly localized deposition routines. Each repair material dispense nozzle 124 operates as a discrete vector outlet whose discharge is coordinated in milliseconds with the mist nozzle 126 assigned to that same position. The mist nozzle 126 for any inactive dispense nozzle 122 remains closed, ensuring that no liquid is sprayed onto the general turf surface. As a result, liquid emission is restricted solely to the region of active material release, focusing energy and resources on the repair event and preventing unnecessary wetting or nutrient dispersion across unaffected turf areas.

In another embodiment, the dispenser array 102 can incorporate embedded flow sensors or optical feedback detectors near each nozzle assembly to verify the presence and quality of discharge. The sensors can provide real-time feedback to the control system 500, confirming that each active nozzle 122 is operating within expected pressure and flow parameters. If a deviation is detected—such as a partially obstructed repair material nozzle 124 or an underperforming mist nozzle 126—the control system 500 can automatically compensate by adjusting adjacent nozzle timing or by issuing a maintenance alert to the operator.

Technically, the dispenser array 102 provides a synergistic combination of pneumatic propulsion, localized liquid atomization, and electronic actuation that results in the controlled transformation of a measured cavity within the turf surface 208 into a restored, compacted region of uniform density. By addressing each divot 202 individually through coordinated nozzle activation, the system achieves a physical improvement of the ground surface with minimal waste. Compared with prior auger or rotary-spread mechanisms that distributed bulk material continuously and without feedback, the present configuration enables selective, sensor-driven repair with spatial accuracy on the order of centimeters. The result is a measurable enhancement in fill uniformity, turf recovery speed, and operational efficiency—outcomes that collectively demonstrate the practical, non-abstract technological contribution of the invention.

Referring to FIG. 6, there is illustrated one example of a control system 500 configured to coordinate, monitor, and optimize the operation of the turf repair and condition-management system 100. The control system 500 can include one or more processing, memory, interface, and actuator control elements that work cooperatively to process sensor data, compute divot-fill parameters, and execute selective dispensing through the dispenser array 102.

The microprocessor 502 can be configured as a programmable logic device, such as a Zilog ZNEO, AMD Embedded R-Series, Intel Atom x6000E, ARM Cortex-M7, or equivalent microcontroller architecture. The microprocessor 502 executes embedded control algorithms that govern material flow, air pressure modulation, mist actuation, and compaction timing. In one embodiment, the microprocessor 502 operates under a real-time operating system (RTOS) to ensure millisecond-level synchronization of nozzle firing sequences with vehicle position and sensor input. The processor's instruction set can support both deterministic control routines and adaptive learning algorithms that adjust dispensing based on historical repair data or environmental trends.

The memory 504 can include volatile and non-volatile storage such as RAM, flash, EEPROM, or SSD modules. The memory 504 stores operational parameters, sensor calibration data, nozzle actuation tables, and firmware that defines the control logic of the turf repair and condition-management system 100. In some embodiments, the memory 504 maintains a persistent database of divot data 410, including GPS coordinates 414, geometric profiles 418, and estimated fill volumes 420, allowing the control system to refine subsequent repair operations. Cloud synchronization may also occur periodically, enabling fleet-level analytics and cumulative learning across multiple deployed units.

The display 506 can comprise an onboard touch display, a ruggedized tablet interface, or a remote handheld device used by groundskeeping personnel. The display can present real-time telemetry such as hopper fill levels, nozzle activity maps, pressure readings, and repair verification imagery. Through the user interface, an operator can select operational modes—dry, mist, binder, or growth—and manually override automatic sequences when necessary. Wireless connectivity can permit the same control functionality to be accessed via a mobile application, allowing groundskeepers to monitor and dispatch autonomous or semi-autonomous vehicles 212 from anywhere on the course.

The communication interfaces 508 can include wireless transceivers such as Wi-Fi, LTE, 5G, or LoRa modules, and wired interfaces such as CAN bus or RS-485 for direct linkage to data processing resources 702 over global network 700, computing devices 732, vehicle control networks, and other for other types and kinds of data communications. These interfaces allow the control system 500 to exchange positional and operational data with the aerial drone 214, ground unit 216, and external management servers. Over-the-air (OTA) updates can be transmitted through the communication interface 508 to deploy software revisions, new calibration maps, or updated machine-learning models, ensuring long-term adaptability of the system. The communication layer also enables remote diagnostics and predictive maintenance alerts based on component run-time and performance metrics. In operation, the communication module 508 can maintain synchronized operation during automated or semi-autonomous cycles.

The general-purpose inputs and outputs 510 can provide electrical connections to auxiliary subsystems such as lighting, divot compactor 132 actuation controls, or safety interlocks. The GPIO network can support both analog and digital signaling to manage a range of devices. For example, vibration sensors can signal divot compactor 132 status, and limit switches can indicate hopper door positions. The microprocessor 502 monitors these signals continuously to maintain safe and coordinated operation across all system modules.

The sensor suite 512 can include optical, laser, infrared, ultrasonic sensors, and other sensors used to detect divot presence, measure geometry, verify fill quality, environmental, and for other purposes. The sensors provide multidimensional data inputs, allowing the system to compute divot profiles and determine the required fill quantity in real time. Environmental sensors such as temperature, humidity, and wind-speed sensors can feed the control logic that dynamically modulates droplet size, mist density, and air pressure, thereby ensuring consistent deposition regardless of ambient conditions.

The sensor suite 512 environmental sensor applications can include measuring crosswind vectors, relative humidity, ambient temperature, soil moisture, and other environmental conditions. These parameters are processed by the control system 500 to predict plume trajectory and modify air velocity, nozzle firing sequence, or mist flow rate in real time. For instance, under high crosswind conditions, the manifold pressure is increased asymmetrically across the array to maintain accurate divot targeting. This predictive correction ensures high positional accuracy and consistent repair quality across varying environmental conditions.

The global positioning system (GPS) module 514 can provide centimeter-level positional accuracy using differential correction, RTK (real-time kinematic) technology, or other location precision approaches. The GPS data is fused with the divot model 418 and ground-unit position data to ensure nozzle activation aligns precisely with each divot's geographic location. When operating cooperatively with the aerial drone 214, GPS synchronization allows for automated path planning and dispatch of the ground unit 216 directly to mapped repair sites.

The environmental sensors 516 can monitor local atmospheric and soil conditions, including wind velocity, relative humidity, temperature, and ground moisture. These readings inform adaptive algorithms that adjust airflow rates, liquid concentration, and compaction pressure to maintain consistent repair outcomes. For instance, under low-humidity conditions, the control system 500 may increase mist volume to prevent desiccation of seed-containing repair materials, whereas during damp conditions it may suppress misting entirely.

The motion and vibration sensors 518 can detect vehicle dynamics and divot compactor 132 feedback. Accelerometer or gyroscopic sensors can measure ground-unit vibration amplitude during the compacting phase, enabling closed-loop adjustment of divot compactor 132 force or rolling speed to achieve uniform surface compression. This motion-aware feedback mechanism enhances repeatability and supports § 101 patentability by demonstrating tangible, automated physical transformation of the ground surface in response to sensed feedback.

The imagery sensors 520 can include cameras, multispectral sensors, time-of-flight imagers, or other imagery sensors positioned on the ground unit 216 (similar imagery sensors can be incorporated into the aerial drone 214). These sensors collect visual data for divot mapping, post-repair verification, and ongoing surface condition monitoring. The control system 500 can employ computer vision algorithms to compare pre- and post-fill imagery, confirming proper volume and contour restoration. Multispectral analysis may also detect areas of poor regrowth, enabling proactive application of binder or growth mode.

The pump controller 522 can manage the activation of each pump 118 associated with liquid delivery lines connected to the mist nozzles 126. The controller regulates pressure and flow rate in coordination with nozzle activation sequences, ensuring that atomized liquid only exits the mist nozzles 126 corresponding to active dispense nozzles 122. Through pulse-width modulation or variable-frequency drive techniques, the pump controller 522 maintains consistent droplet generation independent of temperature or liquid viscosity.

The accelerometer 524 can be configured as a tri-axial MEMS sensor, such as an Analog Devices ADXL series or Bosch BMA series, and can be mounted proximate to the divot compactor 132 or within the chassis of the ground unit 216. The accelerometer 524 measures vibration magnitude, frequency, and directional vector data produced during rolling, tamping, or other compaction events. These acceleration signatures are continuously sampled and digitized for analysis by the microprocessor 502, which compares measured amplitude profiles against stored reference patterns to confirm proper compaction force and material consolidation. When the sensed vibration or acceleration deviates from a target profile—such as excessive rebound indicating underfill, or reduced vibration indicating over-compression—the microprocessor 502 can issue corrective commands to the valve controller 528 or pump controller 522 to adjust airflow pressure or binder delivery in real time. This closed-loop feedback between the accelerometer 524 and downstream actuation subsystems enables adaptive mechanical optimization of the turf surface repair, ensuring uniform density and surface smoothness across diverse soil and turf conditions.

The power supply 526 provides regulated DC power to all electronic and electromechanical components of the control system 500. The power supply can receive primary voltage from the host vehicle 210 or 212 and distribute stepped-down power to low-voltage subsystems such as sensors, processors, and control modules. Energy management circuitry can monitor current draw and temperature to optimize efficiency and extend component life. In certain embodiments, the power supply 526 may include supercapacitor-assisted surge handling to support transient load demands during simultaneous multi-nozzle activation.

The valve controller 528 can command the state of each valve 116 within the manifold 120. By selectively opening and closing airflow or liquid channels, the valve controller 528 governs which nozzles 122 receive pressurized air or liquid at any given moment. The microprocessor 502 can calculate activation timing in microseconds to synchronize airflow initiation with divot position data, yielding efficient and accurate fill control.

Figure 7:
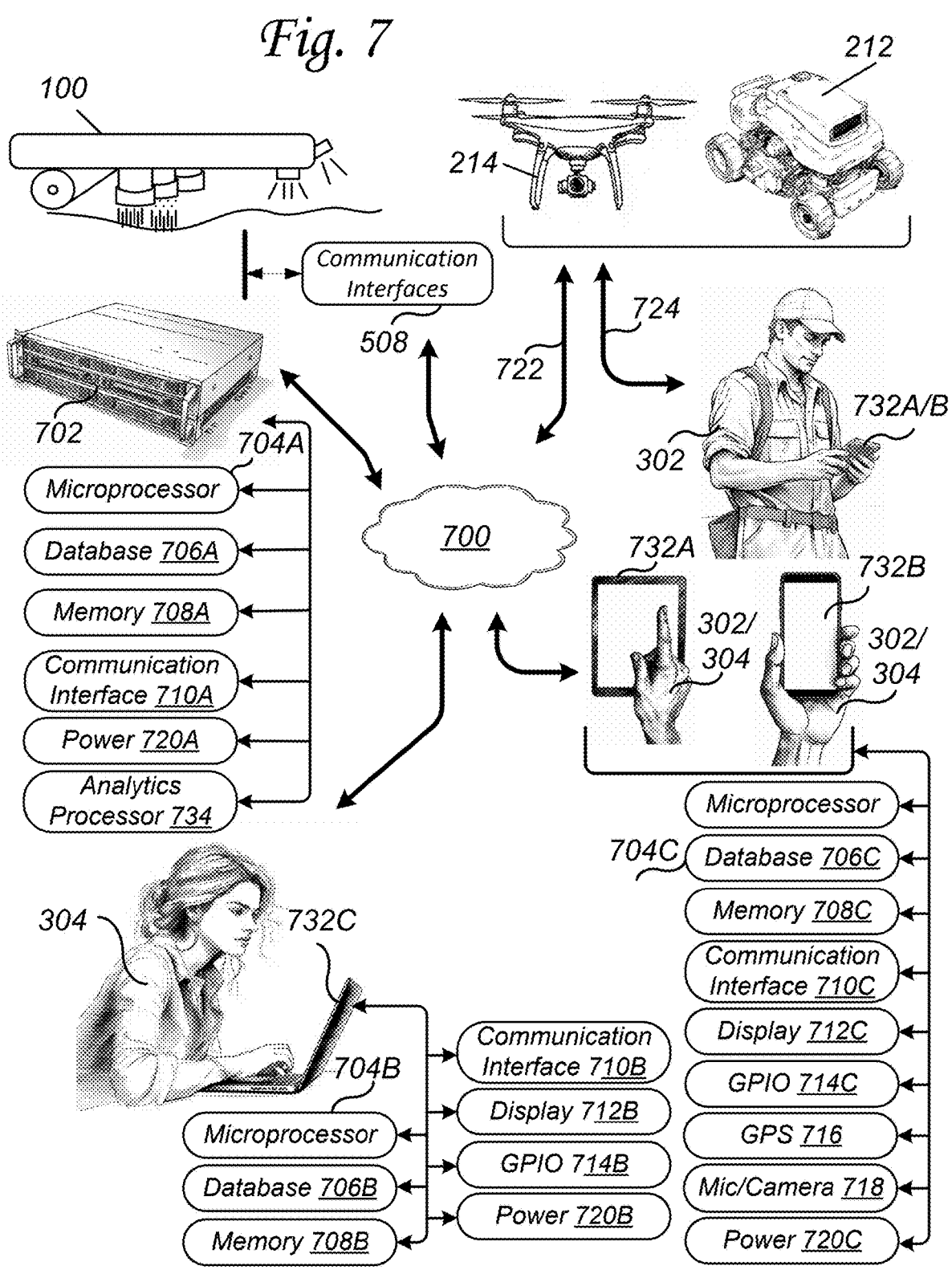
FIG. 7 illustrates one example of a system and network diagram.

Referring to FIG. 7, there is illustrated one example of a network and data-communication architecture configured to support distributed coordination among the turf repair and condition-management system 100, one or more remote data-processing resources 702, and a plurality of computing devices 732A-732C. The system operates within and beyond a global network 700, such as the Internet, but incorporates localized direct-link pathways to ensure secure, low-latency command and data exchange during field operations. The dual-mode communication capability—first via the wide-area global network 700 and second via direct peer-to-peer channels 724—enables the architecture to remain fully functional in connected or disconnected environments, distinguishing the present invention from generic cloud-only implementations.

The global network 700 represents a worldwide digital communication infrastructure that interconnects each component of the turf-management ecosystem. Over this network, telemetry, control parameters, and analytical data can be exchanged between the control system 500 of the ground unit 216, the remote data-processing resources 702, and the computing devices 732 used by authorized personnel. Encryption protocols such as TLS 1.3 or higher can be implemented for secure communication, while network quality-of-service (QoS) settings prioritize low-latency command packets over non-critical telemetry.

Each remote data-processing resource 702 can be configured as a cloud server cluster or edge-computing node that maintains persistent system connectivity. It can include a microprocessor 704A (for example, an AMD EPYC, Intel Xeon, or ARM Neoverse processor), a memory module 708A, a communication interface 710A, and a database 706A. The remote resource 702 executes analytics algorithms for divot mapping, autonomous-route generation, maintenance scheduling, and recovery-rate prediction. Through continuous synchronization with the control system 500, it aggregates divot data 410 received from aerial drones 214 and ground units 216, enabling centralized fleet management and historical performance tracking.

The remote microprocessor 704A executes virtualized container services that process large-scale sensor and image datasets uploaded by multiple field systems. Coupled with the memory module 708A, it can run real-time AI inference routines that identify emerging high-wear patterns, predict divot recurrence probability, and optimize fill-material composition recommendations. Cached datasets within the memory module 708A allow near-instant query responses for connected operators and mobile applications.

The remote database 706A serves as a long-term repository for operational history, GPS coordinates 414, divot model data 418 correlated to fill-volume 420 statistics, and for other purposes. The database schema can be relational or time-series based, with geospatial indexing to allow cross-course analytics. Access control lists ensure that only authenticated computing devices 732A-732C or field systems can read or write data.

The communication interface 710A can include multi-band cellular, satellite, or Ethernet connectivity for data exchange over the global network 700. It supports bidirectional messaging protocols such as MQTT or HTTPS-based REST APIs, or other suitable protocols. The interface also maintains a redundant direct-link bridge 722 to enable resilient communication between the remote server 702, autonomous vehicle 212, and aerial drone 214, ensuring uninterrupted data flow during variable network conditions.

In an exemplary embodiment, data communication 722 allows telemetry, geospatial data, and operational instructions to flow between the remote resources 702 and the mobile elements—namely, the autonomous vehicle 212, aerial drone 214, and associated ground unit 216—via the global network 700. This connection provides global coordination and long-range oversight, including remote mission scheduling, predictive analytics updates, and over-the-air software maintenance. By contrast to generic Internet connectivity, this link can implement adaptive compression of sensor imagery and selective data buffering to minimize bandwidth and energy consumption.

Complementing the global link, direct communication 724 establishes a localized, low-latency channel between a computing device 732 and the nearby autonomous vehicle 212 or aerial drone 214. This connection may utilize Wi-Fi Direct, Bluetooth LE 5.x, or a proprietary 900 MHz mesh network. Through this direct mode, a groundskeeper's tablet 732B or smartphone 732A can issue commands, receive divot-repair confirmations, or view live imagery even when cloud access is unavailable. The two-tier communication approach allows continuous control authority and situational awareness independent of Internet uptime-representing a distinct architectural advantage and supporting the claim that the system performs specific, non-generic, field-optimized data coordination tasks.

Each computing device 732 comprises its own microprocessor 704B/704C, memory 708B/708C, database 706B/706C, communication interface 710B/710C, and display 712B/712C. Devices can include smartphones 732A, tablets 732B, or laptops/desktops 732C. These units execute companion software that provides dashboards for divot repair status, maintenance logs, and real-time camera feeds from the aerial drone 214. A technician 302 or administrator 304 can select operational zones, review divot data 410, and remotely deploy repair missions from the interface. The GPS module 716 and camera suite 718 in mobile units enhance contextual awareness, allowing a technician in the field to geotag anomalies and upload annotated images directly to the remote database 706A.

Power for the remote server 702 can be supplied by power supply 720A, featuring an AC input and battery backup to preserve operation during outages. Mobile computing devices 732A-732C are powered by power supplies 720B/720C, which can include rechargeable lithium-ion cells or hybrid solar packs, ensuring day-long field functionality.

Figure 8:
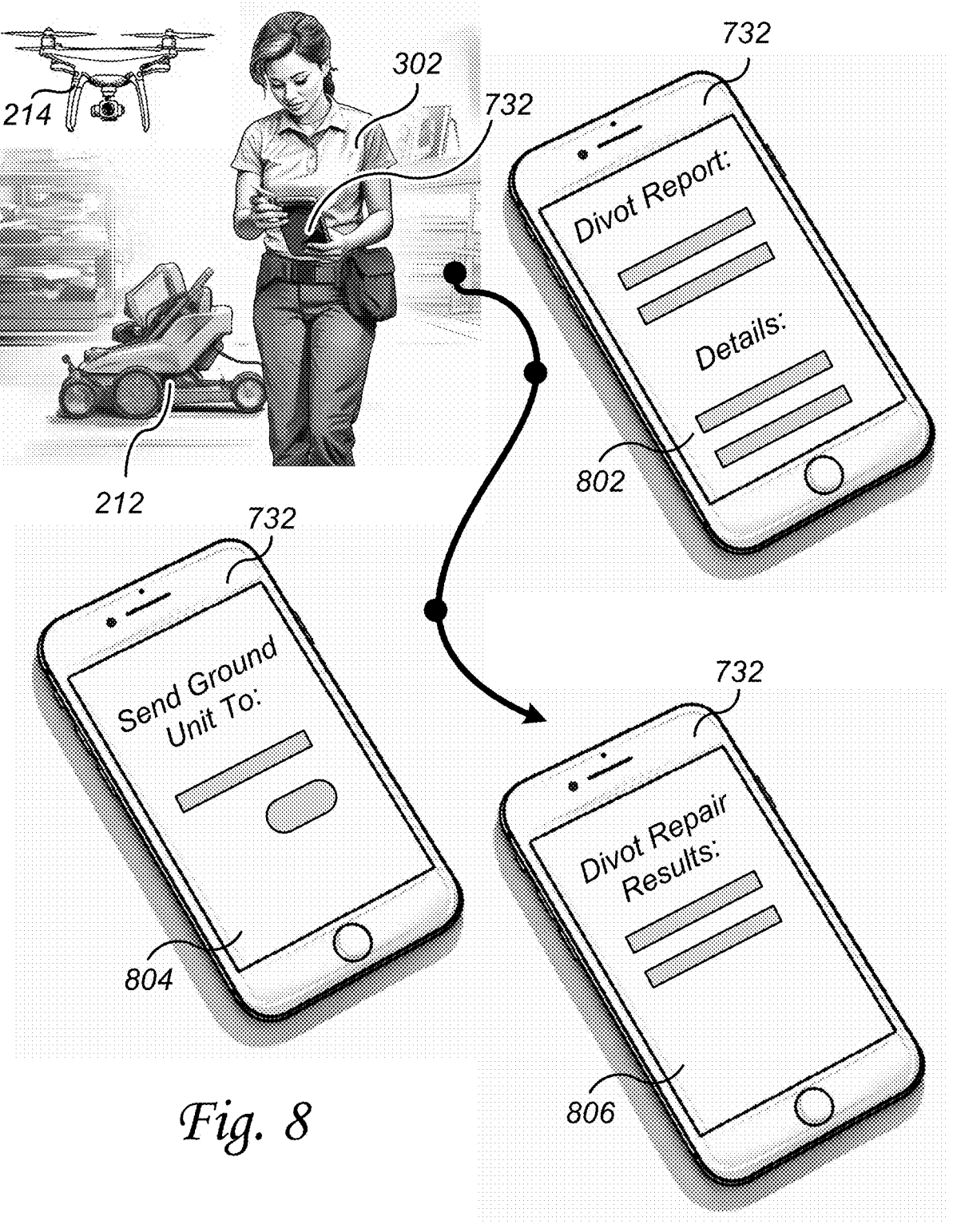
FIG. 8 illustrates one example of a computing device being used by authorized personnel to review divot reports, send ground units to repair divots, and review divot repair results.

Referring to FIG. 8, there is illustrated one example of a computing device user interface configured for use by authorized personnel, such as a technician 302 to manage, verify, and analyze turf-surface repair operations performed by the turf repair and condition-management system 100. Each of the graphical interfaces shown in 802, 804, and 806 can be displayed on a computing device 732, including a smartphone 732A, tablet 732B, or laptop 732C. These interfaces communicate through either the global network 700 or direct communication path 724, thereby allowing the user to review divot information, dispatch autonomous ground units 216, and confirm post-repair results in real time.

In an exemplary embodiment, 802 shows a divot report screen providing detailed visualization and analytics of identified divots 202 across the turf surface 208. The user interface can present a geospatial map overlay populated with individual divot markers corresponding to GPS divot locations 414 generated by the aerial drone 214 or other detection sources. Selecting a marker expands a pop-up summary containing divot data 410, including a unique identifier, date and time of detection, calculated dimensions derived from horizontal and vertical measurements 402/404, and an estimated fill volume 420 computed by the control system 500.

A technician 302 can filter or sort entries by severity, location, or repair priority, and may view historical healing progress for each divot as tracked by multispectral or optical sensors. The system may further present predictive analytics, highlighting turf regions projected to experience higher wear based on aggregated movement and impact patterns. Unlike prior approaches, the present interface integrates continuous ground-unit telemetry, allowing real-time updates of divot conditions without manual inspection, thereby improving accuracy and labor efficiency.

The screen labeled 804 illustrates a dispatch and control dashboard through which a technician 302 can command deployment of an autonomous vehicle 212 or a ground unit 216 equipped with the turf repair and condition-management system 100. The user can select one or multiple mapped divots 202 from the report screen 802 and issue a "dispatch" command. Upon confirmation, the GPS-linked control interface 410 transmits routing instructions and operational parameters to the designated ground unit. The screen may display live telemetry from onboard sensors—including speed, manifold pressure, and nozzle-array activity—to allow the technician 302 to monitor system performance during travel and filling operations.

Manual override controls may also be provided, enabling the technician to pause, resume, or adjust nozzle-array configurations in real time. The control interface 804 further allows configuration of operational modes—such as dry, mist, binder, or growth—matching the environmental conditions or maintenance objectives. Through these capabilities, the interface establishes a closed feedback loop between human oversight and machine autonomy, ensuring that each divot repair cycle is precisely targeted and verifiable.

The screen labeled 806 represents a repair-results dashboard displayed on the computing device 732 after completion of one or more repair tasks. The interface can receive and render data transmitted from the ground unit 216 and the aerial drone 214 through either the global network 700 or the direct communication link 724. Each completed divot record is updated to show measured versus predicted fill volume, liquid-mist composition applied, and surface-level uniformity based on the optical verification module 222 and accelerometer 524 data collected during compaction.

High-resolution imagery from the aerial drone 214 or onboard cameras can be displayed side-by-side with pre-repair images, enabling the technician 302 or course manager to visually confirm restoration quality. The user interface may further allow annotation of anomalies such as incomplete fill, surface bulge, or poor compaction and can trigger automatic rescheduling of follow-up inspections. Over time, the remote data-processing resource 702 aggregates these results within the remote database 706A to generate statistical reports and predictive recommendations for future maintenance cycles.

Through these coordinated interfaces, the present invention provides an end-to-end digital workflow—from detection, to dispatch, to verification—within a unified, data-synchronized ecosystem. The combination of real-time sensor data, AI-driven analytics, and interactive control differentiates the system from generic monitoring dashboards by embedding tangible operational control pathways that directly influence physical field operations and measurable turf outcomes.

Figures 9, 10:
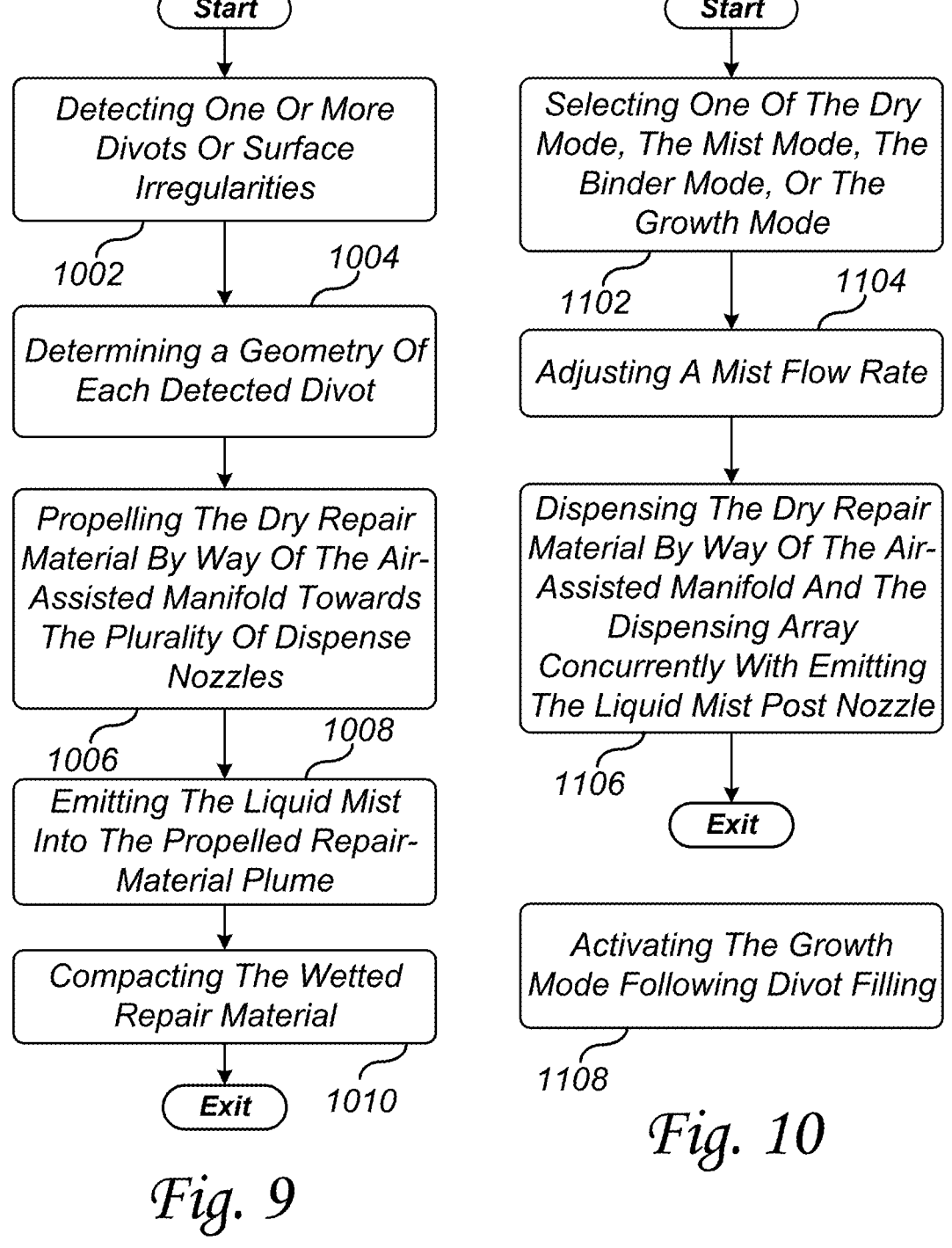
FIGS. 9-11 illustrates examples of methods of using the turf repair and condition-management system.

Referring to FIG. 9, there is illustrated one example of a method flowchart depicting a sequence of operations executed by the turf repair and condition-management system 100 to automatically detect, fill, and stabilize divots 202 and other turf-surface irregularities 208. The method can be implemented by the control system 500 in communication with the sensors, air-assisted manifold 120, dispensing array 102, and liquid-mist subsystem 126. Each operation is carried out under closed-loop feedback, ensuring that the quantity, trajectory, and moisture content of the dispensed material correspond precisely to the detected geometry of each divot.

In step 1002, the one or more sensors 152 of the control system 500 detect the presence and position of one or more divots 202 or other surface irregularities on the turf surface 208. The sensors can include optical, ultrasonic, or LiDAR-based ranging modules configured to scan the ground ahead of the ground unit 216 or to receive pre-mapped data from an aerial drone 214. The resulting divot data 410 is transmitted to the control system and correlated with GPS divot location 414 coordinates. Each divot's perimeter 204, depth 408, and horizontal and vertical dimensions 402/404 are captured to form a digital divot model 418 for use in later stages of the process. By continuously updating this spatial dataset, the system can dynamically adjust nozzle activation zones as the ground unit traverses the turf surface 208.

In step 1004, the control system 500 processes the incoming measurement data to compute the geometry of each detected divot 202. The control logic, implemented on the microprocessor 502, analyzes the captured depth 408 and dimensional data 406A-E to determine a corresponding estimated fill volume 420. This calculation allows the system to predict the amount of repair material 112 and liquid required to restore the displaced turf volume. Using these computed parameters, the control system also identifies which subset of dispense nozzles 122 within the dispenser array 102 will be activated, as well as the duration and intensity of discharge through each active nozzle. This geometrically adaptive targeting represents a significant improvement over prior approaches, which often applied uniform material quantities and produced inconsistent fill results.

In step 1006, the air source 114 generates a controlled air stream directed through the manifold 120, propelling the dry repair material 112 stored in the repair-material hopper 128 toward the plurality of dispensing nozzles 122. The system's combiner 130 can use the air flow to entrain and accelerate the granular repair material, maintaining a uniform density and preventing clogging. By employing air-assisted transport rather than auger or screw feed mechanisms of prior approaches, the system avoids material compaction and achieves smoother, clog-free conveyance. The air-assisted movement ensures that the dry particles maintain sufficient momentum for controlled projection toward the target divot region while remaining free of pre-moistening that could cause clumping.

In step 1008, the liquid-mist subsystem 126 activates to emit a fine, atomized mist into the moving repair-material plume during discharge. The mist may comprise water 104, a binder tackifier 106, or other liquids 108, such as turf-growth solutions, depending on the operational mode selected by the control system 500. The system is designed so that each mist nozzle 126 operates only in coordination with its paired repair-material dispense nozzle 124—ensuring that mist is applied exclusively where repair material is being ejected, not broadly across the surface. The mixing occurs externally to the nozzles: the two streams converge in open air or upon impact with the turf surface 208, creating a wetted repair material precisely at the point of deposition. This configuration reduces overspray, eliminates internal condensation, and enables precise control of moisture content within each filled divot. The control system can modulate droplet size and mist duration based on airflow speed and divot geometry to achieve consistent blending.

In step 1010, once the repair material has been deposited and lightly wetted, the divot compactor 132 follows the dispensing array 102 to smooth and compress the repaired region. The divot compactor 132 can employ rolling, vibration, or tamping mechanisms to achieve uniform surface compression. The accelerometer 524 and optical verification module 222 monitor vibration and contour changes in real time, confirming that the filled area conforms to an expected post-repair contour. When deviation from the target profile is detected, the control system 500 can trigger supplemental material discharge or re-compaction until surface uniformity is achieved. The resulting turf surface 208 exhibits restored continuity and improved durability, with water infiltration and root-growth properties similar to undisturbed surrounding turf.

Through these coordinated operations, the turf repair and condition-management system 100 provides a repeatable, automated, and data-driven process for restoring turf surfaces. By dynamically measuring divot geometry, controlling air-assisted material transport, and applying liquid mist precisely where needed, the system achieves efficient, high-quality surface restoration with reduced waste and human intervention-advantages unattainable by prior manual or semi-automated repair methods.

Referring to FIG. 10, there is illustrated one example of a method of using the modular-frame embodiment of the turf repair and condition-management system 100 for precision mode control and mist-assisted repair operations. The method is implemented through the control system 500 communicating with the air-assisted manifold 120, dispensing array 102, and liquid-mist subsystem 126, each of which is mounted on a modular frame attachable to a host vehicle 210. The method enables dynamic operational selection, precise mist modulation, and coordinated discharge to ensure consistent material deposition and surface quality across variable turf conditions.

In step 1102, an operator or the control system 500 selects one of several operational modes configured within the liquid-mist subsystem 126:

Dry Mode, in which the repair material 112 is delivered through the repair-material dispense nozzles 124 without liquid assistance;

Mist Mode, in which atomized water 104 is emitted through the mist nozzles 126 to hydrate the repair material and mitigate dust during filling;

Binder Mode, in which a tackifier or adhesive binder 106 is atomized to create semi-permanent cohesion and surface stabilization; or Growth Mode, in which a nutrient or turf-growth solution 108 is applied to stimulate accelerated turf recovery following compaction.

The selection can be made via a user interface 804 on a computing device 732, or automatically based on environmental feedback such as humidity, temperature, or wind detected by the sensors coupled to the control system 500. The control logic can interpret this data to determine the most effective mode for prevailing field conditions for example, selecting the binder mode in dry, windy environments to prevent material displacement. This dynamic, data-driven mode switching differentiates the present invention from prior approaches, which relied on single-function manual sprayers or uniform feed systems incapable of adjusting operational modes in real time.

In step 1104, the control system 500 modulates the mist flow rate emitted by the mist nozzles 126 to achieve an optimal liquid-to-material ratio. The adjustment can be performed manually by a technician 302 or automatically by sensor feedback. Flow rate control is accomplished by the pump 118, which meters liquid from the liquid hoppers 110, and the valves 116 associated with each mist nozzle 126.

The system can dynamically regulate mist flow based on sensor feedback, including air pressure within the manifold 120, ambient wind speed, and vehicle motion data from the accelerometer 524. The droplet size and atomization frequency may also be varied to ensure even distribution within the repair-material plume. For example, during high-velocity ground travel, the control system may increase atomization rate while reducing droplet diameter to maintain effective mixing in flight. The adaptive control of mist parameters allows for consistent adhesion and hydration performance, even under fluctuating field conditions—a technical advantage not achievable with fixed-rate, manually triggered sprayers used in prior turf-repair equipment.

In step 1106, the system concurrently dispenses the dry repair material 112 and emits the selected liquid mist through the dispensing array 102. The air source 114 propels the dry material through the manifold 120 toward the dispense nozzles 122, while the liquid-mist subsystem 126 emits the liquid into the air stream at the nozzle exit. The liquid and dry materials meet externally to the nozzles— never within the conduit—ensuring that all internal pathways remain dry to prevent clogging or buildup. Only the mist nozzles 126 associated with active dispense nozzles 122 are triggered, focusing liquid precisely where material ejection occurs.

The air-assisted propulsion generates a repair-material plume that is enveloped by the mist, reducing airborne dust, improving seed hydration, and enhancing material adhesion upon impact with the turf surface 208. In binder or growth mode, the liquid layer further bonds or enriches the deposited mixture, improving durability and turf-recovery rate. The resulting wetted repair material forms a uniform fill layer that integrates seamlessly with the surrounding soil and root structure.

This integration of synchronized air-assisted transport and mode-specific post-nozzle mist emission achieves results unattainable by prior turf-repair systems, which often relied on mechanical augers or unmodulated liquid sprayers. The system's ability to coordinate multi-mode dispensing and feedback-controlled liquid regulation provides a highly efficient, repeatable, and adaptive turf-restoration process-representing a clear advancement in precision grounds-maintenance technology.

In step 1108, after completion of the primary divot-filling and compaction operations, the control system 500 initiates the growth mode of the liquid-mist subsystem 126 to apply a grass-growth solution across the freshly repaired area. The growth mode can be activated automatically in sequence following the compaction phase, or manually by an operator through a user interface 804 displayed on a computing device 732. Upon activation, the pump 118 and valves 116 meter a measured volume of liquid from the liquid hoppers 110, selecting the compartment containing the growth-promoting formulation 108.

The growth solution can include one or more biostimulants, nutrient complexes, or microbial accelerants suspended in water 104 and atomized through the mist nozzles 126. Each mist nozzle 126 associated with an active dispense nozzle 122 emits a fine, low-pressure mist directed specifically toward the divot 202 location recently filled and compacted. The atomization profile—characterized by droplet size, dispersion angle, and flow rate—is controlled by sensor feedback to achieve uniform surface wetting while minimizing runoff or overspray onto adjacent turf regions.

The applied mist permeates the surface of the repair material 112, which may comprise sand and seed mixtures, facilitating moisture retention and immediate nutrient availability to the newly seeded region. As the air-assisted manifold 120 and combiner 130 maintain a dry delivery path, the liquid is introduced only at the post-nozzle region, ensuring the growth solution remains atomized and aerated upon contact with the soil surface. The inclusion of the growth mode provides a synergistic link between mechanical repair and biological regeneration—transforming the repair event from a mere physical fill into an active turf-recovery cycle.

From a control standpoint, the analytics processor 734 integrated into the control system 500 can track the GPS coordinates 414 and timestamp of each growth-mode activation, storing this data within a remote database 706A through communication over either the global network 700 or the direct communication link 724. Subsequent sensor readings from aerial drone 214 imaging or ground-based optics can be correlated with these records to evaluate the recovery rate and health of the treated turf. This closed-loop biological feedback system enables adaptive calibration of future growth-mode applications—such as adjusting nutrient ratios or mist intervals based on measured regrowth performance.

By integrating precision misting hardware with adaptive software control and biological response analytics, the growth mode of the present invention extends the scope of turf maintenance beyond repair toward long-term turf conditioning. Prior approaches that relied solely on physical divot filling lacked this regenerative functionality and required manual fertilizer or growth-promoter application days later. In contrast, the present invention automates that process immediately following repair, providing continuous, sensor-validated enhancement of turf health and accelerating natural regrowth.

Figure 11:
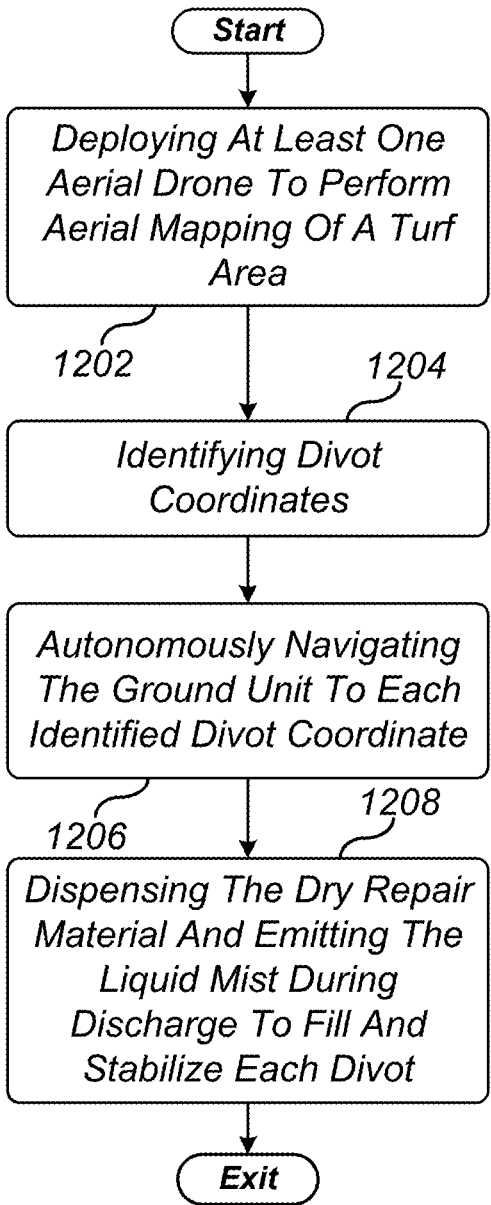

Referring to FIG. 11, there is illustrated one example of a method of using the turf repair and condition-management system 100 in which aerial mapping, autonomous navigation, and synchronized ground-based filling operations are coordinated through networked communication and control logic. The process enables fully automated detection and repair of divots 202 across large turf surfaces 208 such as golf fairways, athletic fields, or sports complexes. Each step of the method integrates sensor data, positional feedback, and physical actuation within a unified closed-loop control framework.

In an exemplary embodiment, the aerial drone 214 can be equipped with multispectral or near-infrared sensors capable of identifying stressed or thinning turf regions not yet visible to the human eye. The analytics processor 734 can prioritize these zones for preemptive treatment, generating a predictive repair queue transmitted to the ground unit 216. The wireless communication module ensures low-latency coordination between the drone and ground unit, even when operating in partially obstructed or high-interference environments by dynamically switching between global network 700 connectivity and direct short-range 724 communication links.

In step 1202, at least one aerial drone 214 is deployed to fly over a designated turf area 208 and perform aerial mapping. The aerial drone 214 can include onboard imagery sensors such as RGB, multispectral, or infrared cameras, along with a GPS module 716 for high-accuracy geolocation. As the drone traverses the mapped zone, it captures detailed surface imagery and three-dimensional elevation data representing the contour and texture of the turf. The captured imagery is analyzed in real time by the drone's embedded processor or streamed to a remote data-processing resource 702, where divot anomalies are detected by comparing the observed surface to reference elevation models. The drone's integrated communication interface 710A transmits telemetry and image data to the control system 500 of the ground unit 216 via either the global network 700 or the direct communication link 724.

This airborne survey enables the system to identify defects across entire course sections without requiring manual walking inspection. The aerial data forms a digital divot map containing positional and geometric information for each detected divot 202, improving both detection coverage and operational efficiency compared to prior ground-only approaches.

In step 1204, the system identifies divot coordinates 414 from the aerial imagery and processes them to create precise positional and geometric datasets. The analytics processor 734 associated with the remote data processing resource 702 or embedded within the control system 500 interprets the imagery to extract divot perimeters 204, approximate depths 408, and shapes corresponding to displaced turf. The processed data is packaged as divot data 410, which includes coordinate position, size, estimated fill volume 420, and a priority ranking based on severity or proximity. This divot data 410 is transmitted wirelessly to the ground unit 216, which is either integrated with an autonomous vehicle 212 or configured as a towed system behind a host vehicle 210.

The GPS-linked control interface 410 within the ground unit 216 receives these coordinates and plots an optimized route covering each mapped divot location. Because the aerial drone 214 can continuously update mapping data during flight, the ground unit 216 maintains real-time awareness of newly formed divots, enabling continuous adaptation of its repair schedule. This coordinated airborne-to-ground communication is a key differentiator from prior approaches that relied solely on manually reported divot locations or visual surveys.

In step 1206, the ground unit 216 autonomously navigates to each identified divot coordinate 414 using its onboard positioning system and guidance algorithms. The control system 500 interfaces with the GPS module 716 and accelerometer 524 to compute precise position, heading, and velocity data. Based on the coordinate list received from the aerial drone 214, the navigation module within the control system generates a travel path that minimizes distance and traversal time between divots. The ground unit may operate independently as an autonomous vehicle 212 or as a semi-autonomous implement coupled to a host vehicle 210 under limited supervisory control.

During navigation, the communication interface 508 maintains synchronization with the aerial drone 214 and the remote server 702, enabling live adjustment of routes in response to drone-detected updates or environmental changes such as weather or ground obstruction. As the ground unit approaches each target coordinate, onboard proximity sensors confirm alignment between the dispensing array 102 and the mapped divot 202 before initiating repair operations. This spatial coordination allows precise targeting without the need for operator steering, reducing human workload and improving repair accuracy.

In step 1208, once the ground unit 216 reaches the vicinity of a mapped divot 202, the control system 500 initiates the repair cycle. The air source 114 propels the dry repair material 112 from the repair material hopper 128 through the air-assisted manifold 120 and into selected dispense nozzles 122 of the dispensing array 102. The system selectively activates only those nozzles directly above or adjacent to the detected divot coordinate, ensuring that material is delivered exactly where needed. Simultaneously, the liquid-mist subsystem 126 emits an atomized mist—comprising water 104, binder tackifier 106, or growth-promoting solution 108—into the material plume external to the nozzle outlets. The combined plume of air-propelled repair material and mist deposits into the divot cavity, forming a wetted, compactable fill.

Following deposition, the divot compactor 132 smooths and compresses the filled region, while the optical verification module 222 captures post-repair imagery for quality validation. These results are relayed via the communication interface 508 back to the remote database 706A, where the analytics processor 734 updates each repair record with a timestamp, GPS location, and surface-profile data. The coordinated execution of airborne mapping and ground-based repair creates a self-contained operational cycle—from detection to restoration—executed without manual intervention.

In an exemplary embodiment, the analytics processor 734 employs machine-learning models trained on historical turf-regrowth data to correlate environmental conditions, material composition, and recovery rates. The system then automatically adjusts binder-to-water ratios and the activation of the growth mode to maximize regrowth efficiency. Over time, these models adapt to specific field or course conditions, allowing the system to "learn" site-specific performance behaviors.

Additionally, in an exemplary embodiment, the analytics processor 734 can be configured to execute an operational workflow that includes receiving raw image and sensor data from the aerial drone 214, the ground unit 216, and the control system 500. The analytics processor 734 preprocesses this data to identify repaired divots 202, evaluate post-repair turf conditions, and extract indicators of regrowth progress such as vegetation density, color uniformity, and moisture content. Using machine-learning inference models trained on historical maintenance and environmental datasets, the analytics processor 734 generates predictive regrowth timelines and identifies regions exhibiting delayed or abnormal recovery. These predictions are transmitted to the control system 500 to adjust future repair parameters—such as seed-to-sand ratio, binder concentration, or activation of the growth mode—to enhance site-specific turf performance. Through this feedback loop, the analytics processor 734 transforms raw sensor input into actionable repair and maintenance adjustments, creating an adaptive and continuously improving turf-management ecosystem.

In another exemplary embodiment, the analytics processor 734 can be communicatively linked with one or more remote data processing resources 702 through the global network 700 to enable cloud-based model synchronization and distributed computational learning. Operational data, including image captures, environmental metrics, and repair outcomes, can be uploaded from the control system 500 to a remote database 706A, where aggregated datasets from multiple turf sites are analyzed to retrain predictive models for turf regrowth and surface wear. Updated machine-learning weights or inference parameters are then transmitted back to the local analytics processor to improve on-device decision accuracy without requiring manual recalibration. This cloud-interconnected structure provides continuous system enhancement through real-world feedback and environmental diversity, ensuring that the ground unit 216 and aerial drone 214 remain adaptive to changing soil, climate, and usage conditions across different courses or facilities. The result is a dynamically evolving, data-driven repair and maintenance network that improves both precision and efficiency over time.

In yet another exemplary embodiment, the analytics processor 734 can utilize updated predictive models to autonomously generate or modify operational routes for the aerial drone 214 and the ground unit 216. Based on analyzed regrowth performance, historical wear trends, and forecasted turf stress regions, the analytics processor 734 computes priority zones and optimized traversal paths to preemptively inspect or repair at-risk areas. These computed routes are transmitted to the GPS-linked control interface for execution, enabling the drone 214 to conduct targeted imaging passes and the ground unit 216 to perform proactive surface treatments using the most appropriate operational mode—such as mist mode for hydration or growth mode for nutrient reinforcement. This closed-loop coordination between prediction, scheduling, and actuation allows the system to function as an intelligent turf-maintenance network that anticipates surface degradation rather than merely reacting to it, thereby improving both turf health and maintenance efficiency across successive operating cycles.

This integration of aerial drone 214 reconnaissance, autonomous vehicle 212 mobility, and precision dispense system 100 operation provides a level of scalability and accuracy unavailable in prior turf-maintenance approaches. By coupling real-time sensing, GPS-linked control, and adaptive discharge control, the present invention transforms divot management from a reactive, labor-intensive task into a proactive, data-driven maintenance process capable of maintaining uniform turf conditions across large playing surfaces.

To facilitate ongoing reliability, the system may perform automated purge and calibration cycles in which the manifold 120 sequentially activates each dispense nozzle 122 to clear residual material. Safety interlocks prevent liquid discharge when the vehicle is stationary unless maintenance mode is selected. Pressure sensors within the air source 114 and liquid hoppers 110 ensure operation within defined safety thresholds, automatically suspending output if abnormal readings occur.

The integration of distributed air-assisted material propulsion, selective misting control, environmental compensation, and autonomous drone-ground coordination provides a cohesive, technical improvement in automated turf repair. Unlike manual or semi-automated systems that rely on uniform broadcasting, the present system executes localized, data-driven restoration cycles that continuously refine performance through sensor feedback and analytics. This results in quantifiable improvements in accuracy, material efficiency, and turf regrowth consistency, representing a distinct technical advance in field-surface maintenance automation.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A turf repair and condition-management system configured for automated detection, filling, and monitoring of divots and turf surface irregularities, the system comprising:

a hopper configured to store a dry repair material comprising sand, seed, or a mixture thereof;

an air-assisted manifold coupled to the hopper and configured to propel the dry repair material through a plurality of conduits;

a plurality of dispensing nozzles fluidly coupled to the plurality of conduits and arranged in an array extending along a width of the system;

a liquid-mist subsystem positioned proximate the plurality of dispensing nozzles and configured to emit a liquid mist into a propelled repair-material plume during discharge such that the liquid and the dry repair material mix in flight or upon impact with a turf surface, wherein the liquid mist comprises water, binder, or combinations thereof;

a control system operatively coupled to the air-assisted manifold and the plurality of dispensing nozzles, the control system configured to:

receive input from one or more sensors measuring a location, geometry, and depth profile of each detected divot;

selectively activate one or more of the plurality of dispensing nozzles in the array based on the detected divot location and geometry; and regulate a duration and intensity of discharge through each activated dispensing nozzle via the air-assisted manifold so that varying amounts of the dry repair material are delivered in correspondence with the divot's depth and profile.

2. The system of claim 1, further comprising an optical verification module configured to capture post-fill imagery of each repaired divot and compare a resulting surface contour to an expected contour to confirm proper fill and compaction.

3. The system of claim 1, wherein the liquid-mist subsystem comprises an annular atomizing emitter surrounding each dispensing nozzle.

4. The system of claim 1, wherein the control system synchronizes liquid-mist emission with nozzle valve timing to achieve proportional wetting relative to divot depth and vehicle speed.

5. The system of claim 1, wherein the control system computes a divot fill volume from the measured divot geometry and adjusts air pressure and valve timing of each activated dispensing nozzle to deliver a proportional amount of the dry repair material.

6. The system of claim 1, further comprising a smoothing or compression assembly positioned downstream of the dispensing nozzles to level and compact the repaired area.

7. A method of using the turf repair and condition-management system of claim 1, the method comprising the steps of:

detecting one or more divots or surface irregularities using the at least one sensor;

determining a geometry of each of the one or more divots detected;

propelling the dry repair material by way of the air-assisted manifold toward the plurality of dispensing nozzles;

emitting the liquid mist into the propelled repair-material plume during discharge such that the liquid and the dry repair material mix in flight or upon impact with the turf surface, creating a wetted repair material; and compacting the wetted repair material within each of the one or more divots to form a stabilized turf surface.

8. A turf repair and condition-management system configured for automated detection, filling, and monitoring of divots and turf surface irregularities, the system comprising:

a modular frame having a mechanical interface configured for removable coupling to a host vehicle;

a hopper mounted on the modular frame and configured to store a dry repair material comprising sand, seed, or a mixture thereof;

an air-assisted manifold coupled to the hopper and configured to propel the dry repair material through a plurality of conduits;

a dispensing array comprising a plurality of dispensing nozzles, each dispensing nozzle fluidly coupled to a corresponding one of the plurality of conduits and including an individually controllable valve;

a liquid-mist subsystem co-located with the dispensing array and configured to operate in a selectable mode, including at least one of the following:

a dry mode in which the dry repair material is delivered without liquid addition;

a mist mode in which atomized water is emitted to reduce dust and hydrate seed upon impact;

a binder mode in which a tackifier solution is emitted to create semi-permanent cohesion of the deposited repair material; or a growth mode in which a grass-growth solution containing at least one of a biostimulant, nutrient complex, or microbial accelerant is atomized onto the repaired divot area to promote accelerated turf regrowth;

a control system operatively coupled to the air-assisted manifold, the dispensing array, and the liquid-mist subsystem, the control system configured to:

receive input from one or more sensors detecting at least one of airflow, humidity, temperature, vehicle speed, material-discharge rate, or divot geometry;

dynamically, based on the selectable mode, modulate a mist flow rate, a droplet size, and a binder or a growth-solution concentration based on the received sensor input or stored operational data; and maintain a dry internal delivery path while providing external wetting of the repair material for deposition stability.

9. The system of claim 8, wherein the control system executes a multi-stage fill sequence in which initial discharge provides a base layer of the dry repair material, followed by one or more subsequent discharges of mist mode or binder mode solutions to complete the repair profile.

10. The system of claim 8, wherein the dispensing array is configured such that individual ones of the plurality of dispensing nozzles are selectively activated by the feedback controller based on divot location and geometry, and wherein the feedback controller regulates an air-pressure duration and intensity for each activated dispensing nozzle to deliver varying amounts of the dry repair material corresponding to a detected divot depth profile.

11. The system of claim 8, wherein the control system adjusts manifold air pressure or nozzle airflow distribution based on measured crosswind and vehicle speed to maintain a consistent material-impact footprint.

12. The system of claim 8, wherein the control system adjusts a sand-to-seed ratio of the dry repair material based on detected turf type or historical regrowth performance data.

13. A method of using the turf repair and condition-management system of claim 8, the method comprising the steps of:

selecting one of the dry mode, the mist mode, the binder mode, or the growth mode of operation;

adjusting the mist flow rate; and dispensing the dry repair material by way of the air-assisted manifold and the dispensing array while concurrently emitting the liquid mist post-nozzle, at the mist flow rate to reduce dust and enhance adhesion.

14. The method of claim 13, further comprising the step of:

activating the growth mode following divot filling, wherein the liquid-mist subsystem applies a grass-growth solution to the repaired area to enhance turf recovery.

15. A turf repair and condition-management system configured for automated detection, filling, and monitoring of divots and turf surface irregularities, the system comprising:

a ground unit including:

a hopper configured to store a dry repair material comprising sand, seed, or a mixture thereof;

an air-assisted manifold coupled to the hopper and configured to propel the dry repair material through a plurality of conduits;

a plurality of dispensing nozzles each fluidly coupled to a corresponding one of the conduits and including an individually controllable valve;

a liquid-mist subsystem positioned proximate the plurality of dispensing nozzles and configured to emit a liquid mist into a propelled repair-material plume during discharge such that the liquid and the dry repair material mix in flight or upon impact with a turf surface; and a control system configured to synchronize actuation of the air-assisted manifold, the individually controllable valves, and the liquid-mist subsystem based on detected divot geometry and platform speed;

at least one aerial drone configured to perform aerial mapping of divots and to transmit geographic coordinate data to the ground unit;

a GPS-linked control interface in communication with the ground unit and the at least one aerial drone, the GPS-linked control interface configured to associate each mapped divot with a recorded repair event;

an analytics processor configured to track turf-regrowth conditions using optical or multispectral data and to predict high-wear zones based on historical and environmental information; and a wireless communication module configured to enable synchronized operation between the ground unit and the at least one aerial drone during automated or semi-autonomous repair cycles.

16. The method of claim 15, wherein the liquid mist comprises water in a mist mode or a binder solution in a binder mode, and is emitted only after the repair material exits the nozzle to either reduce dust and hydrate seed or to create semi-permanent cohesion of the repair material.

17. The system of claim 15, wherein the analytics processor applies a machine-learning algorithm to identify slow-healing or abnormal turf zones.

18. The system of claim 15, wherein the control system of the ground unit selectively activates individual ones of the plurality of dispensing nozzles based on divot geometry transmitted from the aerial drone, and regulates a fill duration and material flow intensity through each activated nozzle so that varying amounts of the dry repair material are dispensed in correspondence with a measured divot depth.

19. The method of claim 15, wherein the at least one aerial drone and the ground unit exchange real-time positional and sensor data over a wireless communication link, and wherein the ground unit dynamically adjusts a nozzle-activation pattern and discharge volume in response to the positional data transmitted from the aerial drone to maintain alignment with each detected divot during motion.

20. A method of using the turf repair and condition-management system of claim 15, the method comprising the steps of:

deploying the at least one aerial drone to perform aerial mapping of a turf area;

identifying divot coordinates from data captured by the at least one aerial drone and transmitting the divot coordinates to the ground unit;

autonomously navigating the ground unit to each identified divot coordinate; and dispensing the dry repair material and emitting the liquid mist during discharge to fill and stabilize each divot.

* * * * *